(12) United States Patent
Nix

(10) Patent No.: US 11,979,508 B2
(45) Date of Patent: May 7, 2024

(54) SECURE IDS CERTIFICATE VERIFICATION FOR A PRIMARY PLATFORM

(71) Applicant: IoT and M2M Technologies, LLC, Evanston, IL (US)

(72) Inventor: John A. Nix, Evanston, IL (US)

(73) Assignee: IOT AND M2M TECHNOLOGIES, LLC, Evanston, IL (US)

( * ) Notice: Subject to any disclaimer, the term of this patent is extended or adjusted under 35 U.S.C. 154(b) by 192 days.

(21) Appl. No.: 17/413,681

(22) PCT Filed: Dec. 13, 2019

(86) PCT No.: PCT/US2019/066257
§ 371 (c)(1),
(2) Date: Jun. 14, 2021

(87) PCT Pub. No.: WO2020/123959
PCT Pub. Date: Jun. 18, 2020

(65) Prior Publication Data
US 2022/0014389 A1   Jan. 13, 2022

Related U.S. Application Data

(60) Provisional application No. 62/779,791, filed on Dec. 14, 2018.

(51) Int. Cl.
*H04L 29/06* (2006.01)
*G06F 8/41* (2018.01)
(Continued)

(52) U.S. Cl.
CPC ............ *H04L 9/3268* (2013.01); *G06F 8/445* (2013.01); *H04L 9/006* (2013.01); *H04L 9/0841* (2013.01); *H04L 9/0861* (2013.01); *H04L 9/3297* (2013.01)

(58) Field of Classification Search
CPC ...... H04L 9/3268; H04L 9/006; H04L 9/0841; H04L 9/0861; H04L 9/3297;
(Continued)

(56) References Cited

U.S. PATENT DOCUMENTS 6,009,177 A   12/1999  Sudia
7,177,839 B1   2/2007  Claxton et al.
(Continued)

OTHER PUBLICATIONS

GlobalPlatform Card Technology, Open Firmware Loader for Tamper Resistant Element Version 1.3, Public Release Jun. 2017 Document Reference: GPC_FST_134 pp. 1-81 (Year: 2017).*
(Continued)

*Primary Examiner* — Evans Desrosiers
(74) *Attorney, Agent, or Firm* — GrowIP Law Group LLC

(57) ABSTRACT

A tamper resistant element (TRE) in a device can operate a primary platform and support a "Smart Secure Platform". The TRE may not keep time when electrical power is removed from the TRE. The device can receive (i) a certificate for an image delivery server (IDS) with a first timestamp and (ii) a signed second timestamp from a certificate authority, comprising a signature according to the Online Certificate Status Protocol (OCSP) with stapling. The device can forward the certificate and second timestamp to the TRE. The device can receive a ciphertext and an encrypted image from the IDS, where the ciphertext includes a third timestamp from a Time Stamp Authority (TSA), and forward the data to the TRE. The TRE can conduct a key exchange to decrypt the ciphertext. The TRE can compare the second and third timestamps to verify the certificate has not been revoked.

16 Claims, 4 Drawing Sheets

(51) Int. Cl.
*H04L 9/00* (2022.01)
*H04L 9/08* (2006.01)
*H04L 9/32* (2006.01)

(58) Field of Classification Search
CPC ... H04L 63/0823; G06F 9/445; G06F 9/4401; G06F 21/57
See application file for complete search history.

(56) References Cited

U.S. PATENT DOCUMENTS

| | | | |
|---|---|---|---|
| 7,409,557 B2 * | 8/2008 | Teppler | H04L 9/3231 713/178 |
| 8,660,958 B2 | 2/2014 | Dare et al. | |
| 10,380,362 B2 | 8/2019 | Nix | |
| 10,389,533 B2 | 8/2019 | Le Saint et al. | |
| 2014/0108786 A1 * | 4/2014 | Kreft | G06Q 20/3825 713/194 |
| 2018/0139612 A1 * | 5/2018 | Rhelimi | H04W 12/08 |
| 2018/0198631 A1 * | 7/2018 | Yang | H04L 63/0442 |
| 2019/0058713 A1 * | 2/2019 | Pala | H04L 63/105 |

OTHER PUBLICATIONS

Santesson et al., X.509 Internet Public Key Infrastructure Online Certificate Status Protocol—OCSP IETF, Request for Comments: 6960 Jun. 2013 pp. 1-41. (Year: 2013).*
GSM Association, "iUICC POC Group Primary Platform requirements", Release 1.0, May 17, 2017.
European Technical Standards Institute (ETSI), "Meeting #81 document SCP(17)000188", Dec. 5, 2017.
Wikipedia, "Elliptic Curve Diffie-Hellman", Mar. 9, 2018.
National Institute of Standards and Technology (NIST) document "NIST SP 800-56A, Recommendation for Pair-Wise Key Establishment Schemes Using Discrete Logarithm Cryptography", Mar. 2007.
Globalplatform, "Open Firmware Loader for Tamper Resistant Element", Version 1.3, Jun. 2017.
Internet Engineering Task Force (IETF), "X.509 Internet Public Key Infrastructure Online Certificate Status Protocol—OCSP" RFC 6960, Jun. 2013.
Internet Engineering Task Force (IETF), "Deterministic Usage of the Digital Signature Algorithm (DSA) and Elliptic Curve Digital Signature Algorithm (ECDSA)" RFC 6979, Aug. 2013.
Federal Institute of Industrial Property, Russia, "Written Opinion of the International Searching Authority" for WO2020123959, dated Apr. 9, 2020.

* cited by examiner

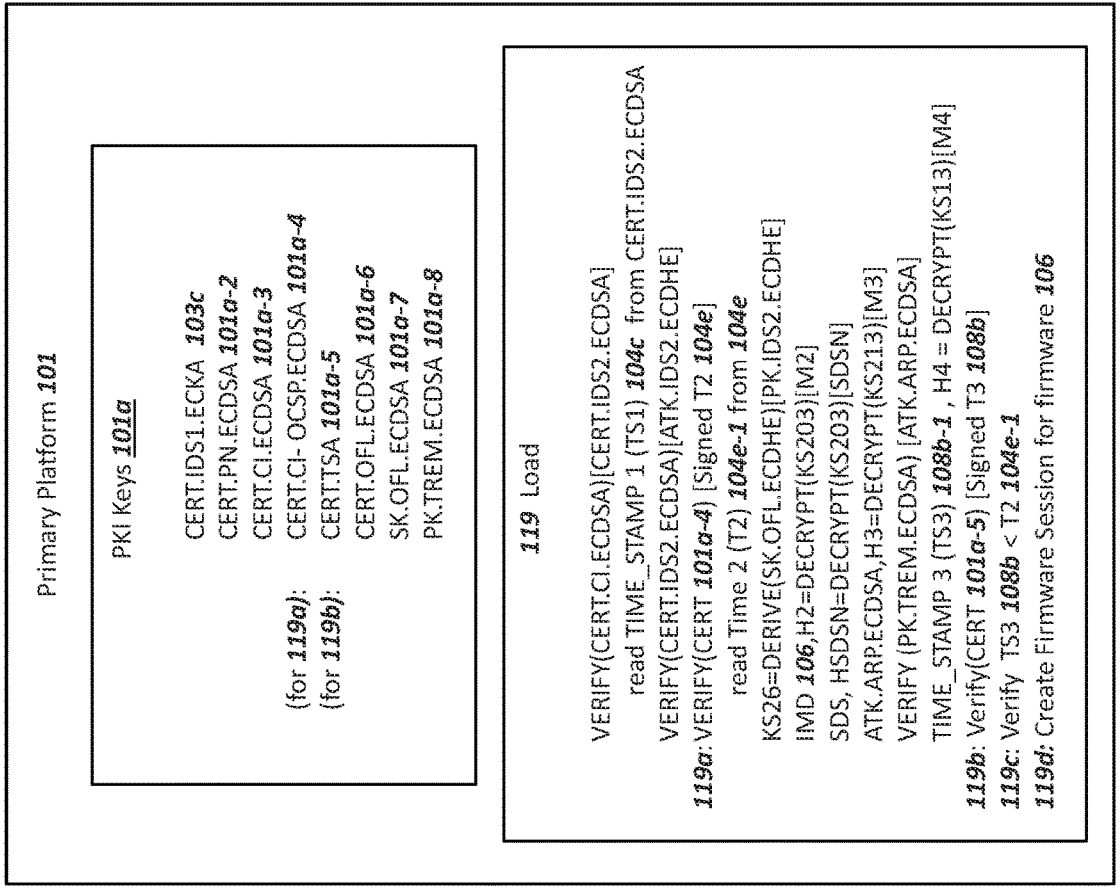
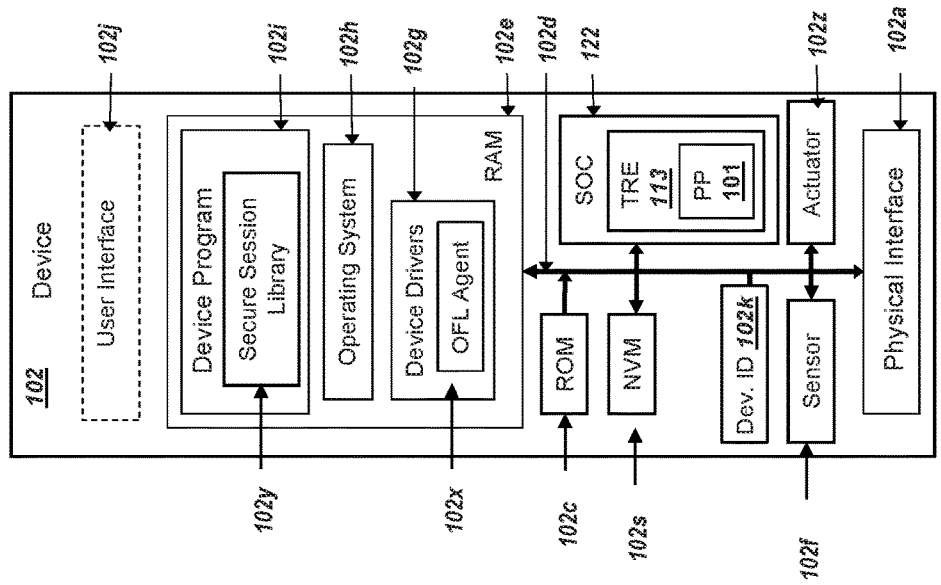

Figure 2a

OCSP Response *110*

Verifying CERT.IDS2.ECDSA with SHA 256 Algorithm ( "..." is long text removed)

Query *109*:
```
OCSP Request Data:
  Version: 1 (0x0)
  Requestor List:
    Certificate ID:
      Hash Algorithm: SHA256
      Issuer Name Hash:
4720293975f71f54ea3b109978fbfd42df90981f5d7885baf20645344634e8c3
      Issuer Key Hash:
d292f2acd0c77180f8f3bb21acc70129136267c5dd8437812faa31478dbb6036
        Serial Number: 743fb24f94b34067b9a09
  Request Extensions:
    OCSP Nonce:
        0410DA634F2ADC31DC48AE89BE64E8252D12
```

```
OCSP Response Data:
  OCSP Response Status: successful (0x0)
  Response Type: Basic OCSP Response
  Version: 1 (0x0)
  Responder Id:
d292f2acd0c77180f8f3bb21acc70129136267c5dd8437812faa31478dbb6036
  Produced At: Dec  9 18:45:00 2018 GMT
  Responses:
  Certificate ID:
    Hash Algorithm: SHA256
    Issuer Name Hash:
4720293975f71f54ea3b109978fbfd42df90981f5d7885baf20645344634e8c3
    Issuer Key Hash:
d292f2acd0c77180f8f3bb21acc70129136267c5dd8437812faa31478dbb6036
      Serial Number: 743fb24f94b34067b9a09
    Cert Status: good
```

T2 *104e-1* → This Update: Dec  9 18:45:00 2018 GMT
            Next Update: Dec 16 19:00:00 2018 GMT Signed T2 *104e*:
```
    Signature Algorithm: ECDSA with SHA256
        56:21:5c:dc:84:11:e7:a8:ac:a7:b9:bc:10:19:f8:19:f1:34:
        c1:63:da:14:7f:8f:5a:22:2a:cc:02:b0:54:b5:05:4a:0f:28:
        50:2a:4a:4d:04:01:b5:05:ef:a5:88:41:d8:3a:38:00:71:76:

...
        d4:2e:5a:9f
    ids2.ecdsa.pem: good
```

T2 *104e-1* → This Update: Dec  9 18:45:00 2018 GMT
            Next Update: Dec 16 19:00:00 2018 GMT

SECURE IDS CERTIFICATE VERIFICATION FOR A PRIMARY PLATFORM

CROSS-REFERENCE TO RELATED APPLICATIONS

The present application claims the benefit of International PCT Patent Application No. PCT/US2019/066257, filed on Dec. 13, 2019, that claims the benefit of the filing date of U.S. Provisional Patent Application Ser. No. 62/779,791, filed Dec. 14, 2018, the content of the foregoing application is expressly incorporated herein by reference in its entirety.

BACKGROUND

Technical Field

The present systems and methods relate to securely transferring firmware to a primary platform from a server, and more particularly for a tamper resistant element (TRE) to determine if a certificate or public key associated with an image delivery server has been revoked.

Description of Related Art

The commercial development and deployment of secure processing environments within microprocessors and tamper resistant elements (TRE) can increase security of computing devices such as mobile phones and networked sensors for the "Internet of Things". A secure processing environment or TRE can enable a device to securely record cryptographic keys and conduct cryptographic operations such as key exchanges, key derivation, and also digital signatures in a computing environment that is isolated from other electrical components within the device that may not be secure. Examples available today include an embedded subscriber identity module (embedded SIM), which is also known as an embedded universal integrated circuit card (eUICC), a traditional SIM card, a secure enclave within a "system on a chip", a trusted execution environment (TEE), and other examples are available as well. A common computing architecture includes a processor with multiple cores, where a secure processing core is isolated from the other cores, and the secure processing core can read cryptographic keys and conduct cryptographic operations. Other possibilities exist as well, including "switching" a generic processor between an insecure mode to a secure mode.

As the number of transistors and memory cells available for a given surface area of silicon continues to grow, the computational power for secure processing environments continues to increase. Some secure processing environments can operate as a host computing environment and provide the functionality of a virtual machine for different firmware images, such that each firmware image can operate as separate computing environments within the secure processing environment. As one example, secure processing environments can now enable a TRE to operate as a primary platform for hosting potentially a variety of different firmware images, where each of the firmware images can support a different application. As one example, a secure processing environment could operate a Java™ virtual machine, and different firmware images could comprise different Java applets or Java-based applications. Each Java applet could comprise different images for the Java virtual machine. A firmware can also comprise the base operating system for a primary platform, such as a primary firmware of machine executable program instructions for the primary platform to operate as a host for secondary firmware to operate as virtual machines. Other possibilities exist as well for a secure processing environment to operate as a primary platform for hosting images, and the images may also be referred to as a firmware image.

A primary platform both (i) operating within a secure processing environment and (ii) using firmware images can support a variety of useful applications for a computing device. The operation of an example primary platform can perform functions outlined in "Open Firmware Loader for Tamper Resistant Element", version 1.3 from Global Platform dated June 2017, which is hereby incorporated by reference in its entirety ("GP OFL document"). An open firmware loader can be referred to as "OFL". The operation of an example primary platform can also perform functions outlined in the GSM Association (GSMA) technical document "iUICC POC Group Primary Platform requirements", Release 1.0 dated May 17, 2017, which is hereby incorporated by reference in its entirety ("GSMA PP Requirements"). Example applications supported by a primary platform using firmware images are identified in Section 3 "Use Cases" of the GSMA PP Requirement. Example applications include firmware for an embedded SIM, a traditional universal integrated circuit card (UICC), mobile payments, secure bootstrapping, digital rights management, user identification such as a drivers license, secure access to home automation, a virtual automobile key, and other applications are identified as well.

Further the European Telecommunications Standards Institute (ETSI) has begun developing standards for a "Secure Primary Platform" (SSP) as part of the development of 5G standards, and an SSP could operate as a primary platform as well. As of December, 2018, the draft standards for an SSP are not available for public review, but will likely support applications similar to those contemplated in the GSMA PP requirements document and GP OFL document. As the standards for operating a primary platform or a secure primary platform (SSP) continue to evolve, new features or the use of new cryptographic algorithms or steps may be introduced. These new features and/or cryptographic steps may require new firmware for the primary platform in order to support new or updated versions of the standards. A need exists in the art for a primary platform to securely receive updated firmware in order to support currently evolving standards and features for the operation of a primary platform or SSP and supported applications.

Secure operation of a primary platform or an SSP for each of the above standards depends on the secure delivery of firmware from a server to the primary platform. Different firmware may be required by a primary platform in order to support each of the above example applications. Further, over time new features may be added to the applications, which would also likely require a firmware update. The GP OFL document provides an overview of a proposed solution in FIG. 2-1 on page 15. Details for an OFL security scheme are outlined in the GP OFL document in FIG. 4-1 on page 33. Secure encryption and also an authenticated delivery of firmware to a primary platform is a significant technical challenge, since the computing device may include insecure components, such as a generic processor and a generic operating system. The insecure device can conduct many of the steps for communicating between (i) a server that sources the firmware and (ii) the primary platform. As one example, the computing device could comprise a mobile phone or "smartphone" based on Android or IOS or similar operating systems and could also either (i) operate with "malware" that is unknown to a user or a network or (ii)

could comprise a "rooted" mobile phone that is under the control of hackers. Many other examples of insecure devices operating a TRE with a primary platform exist as well. Note that the GP OFL document does not include the words "revocation" or "revoked", which are associated with steps to revoke or invalidate a previously issued certificate from a certificate issuer. A need exists in the art for secure steps for a TRE with a primary platform to determine revocation of a certificate or public key for an image delivery server (IDS), an OFL, or an associated server.

A primary platform or a "Smart Secure Platform" operating in a tamper resistant element can be a resource constrained computing environment, compared to a traditional computing environment of a mobile phone or a personal computer. This resource constrained environment can create significant challenges for revocation of a certificate or public key associated with a server supporting the delivery of firmware to the primary platform. As one example, a primary platform may not have an internal clock to keep track of local date and time when power is removed from the primary platform. The primary platform must communicate through the insecure mobile phone or computing device in order to send and receive data with a server, including updated firmware for the primary platform. The primary platform may not have resources to operate a full transport layer security (TLS) stack. In addition, the primary platform may lack computing resources and electrical components for the proper and full implementation of certificate revocation lists, the Online Certificate Status Protocol (OCSP), or associated schemes for checking the potential revocation of a certificate or public key from a server. A need exists in the art for a primary platform operating in a tamper resistant element to use time values received in order to securely determine if a certificate or public key used with cryptographic operations has been revoked.

Both (i) the long timeframes for a tamper resistant element to record and operate with server certificates, which could comprise certificates structured according to the X.509 family of standards and include a certificate issuer (CI) root certificate, and (ii) the use of potentially hundreds or more of IDS certificates signed by the CI root private key increases the importance and likelihood of a need in the art for a TRE to support or determine certificate revocation for a certificate received by the TRE. As one example, the root certificate from the GSMA for the system supporting the embedded universal integrated circuit card (eUICC) currently expires in approximately 2052. The CI certificate recorded in devices for a system of TRE as contemplated by GP OFL may similarly expire in future decades. An IDS may communicate with millions of devices with TREs and hundreds of service providers over time, and may prefer to use an IDS certificate that is valid for several years for operational purposes.

The GP OFL contemplates in section 4.2.6 on page 39 checking for validity of an IDS certificate using a timestamp received, but note this only contemplates the verification that an IDS certificate has not expired, where expiration of the IDS certificate may be several years into the future. There is no teaching or suggestion in the GP OFL for an intermediate check or verification by the TRE that if the IDS certificate or OFL authority certificate has been revoked. A need exists in the art for a primary platform in a TRE to conduct a check for certificate revocation where the device operating the TRE may not directly or efficiently or reliably communicate with the certificate issuer (CI) that signed a certificate used by the TRE, such as an IDS certificate or an image owner certificate.

Note that the IDS may be connected to the public Internet in order to support the potential millions of different devices with a TRE requesting firmware for the PP. This creates potential security risks for protecting the private key of the IDS corresponding to the public key stored by the TRE with an IDS certificate, especially over long period of time such as several years. As one example, the "Heartbleed" vulnerability in OpenSSL potentially exposed the private key operated by servers connected to the Internet. The cloud hosting service Cloudflare around 2014 had to revoke and reissue thousands of server certificates for that one vulnerability. Another, similar vulnerability may be found in the future, and several existing threats for server security continue in the families of Spectre and Meltdown vulnerabilities. The list from Common Vulnerabilities and Exposures contains thousands of entries for the year 2018 alone. Many of these vulnerabilities could result in exposure or leaking of bits of security for a private key of a server corresponding to the public key in a certificate operated by a TRE as contemplated by Global Platform and ESTI standards. Consequently, a need exists in the art for a certificate issuer to revoke a certificate used by a primary platform or "Smart Secure Platform" and reissue the certificate in a manner that the TRE can determine that the certificate has been revoked.

Many other examples exist as well for needs in the art for a primary platform to securely receive firmware from a server using certificates where the primary platform can determine if the certificate has been revoked, and the above are examples are just a few and intended to be illustrative instead of limiting.

SUMMARY

Methods and systems are provided for a primary platform to securely receive firmware from a server. A device can include a tamper resistant element. The primary platform (PP) can operate within the tamper resistant element (TRE) and comprise a secure processing environment operating within a computing device. The primary platform can comprise a secure enclave, a secure element, a trusted execution environment (TEE), or a "Smart Secure Platform" as specified by ETSI standards. The primary platform can also operate within an ARM® Trustzone implementation of a TEE. The TEE can support GlobalPlatform standards for a TEE. The computing device can comprise a mobile phone, wireless device, personal computer, laptop, or a networked transducer for the "Internet of Things". The device can (i) include insecure components such as a general processor and a general operating system and (ii) communicate with the primary platform using a device driver such as an Open Firmware Loader (OFL) agent.

The device can connect with an internet protocol (IP) based network such as the public Internet in order to establish a secure session with a server. The server can comprise an image delivery server (IDS) and receive a firmware image from an image owner. The server can comprise a computer with a network interface to communicate with the device via the IP network. The server can record and operate a server database. The device can be one of a plurality of different devices communicating with the server. The server can operate an online certificate status protocol (OCSP) client in order to periodically obtain a signed verification of certificate validity from a certificate issuer.

In exemplary embodiments an image owner can obtain a firmware image for the primary platform. The firmware image can support the primary platform operating with an application, such as, but not limited to, an eUICC, a "Smart Secure Platform", secure identification of the device using the primary platform, and other possibilities exist as well for supported applications. The image owner can obtain the firmware image for a plurality of different primary platforms. The firmware image from the image owner can comprise an unbound image, which could be subsequently used by the server communicating with a plurality of different primary platforms, after subsequent cryptographic operations by the server with the plurality of different primary platforms in order to create bound images. The image owner can receive a signed timestamp from an open firmware loader (OFL) authority, where the OFL authority also provides additional authorization information for the primary platform. The image owner can send the authorization information and the signed timestamp to the server. For some embodiments, the use of a primary platform could be omitted, and the firmware image could comprise firmware for a processor within a device operating in a secure manner (e.g. Trustzone, TEE, "secure enclave", etc.). In addition, the image owner or IDS could receive the signed timestamp from a server different than a server associated with the OFL authority.

The primary platform and the server can record and operate a set of compatible cryptographic parameters and cryptographic algorithms for an elliptic curve Diffie Hellman (ECDH) key exchange algorithm, a symmetric ciphering algorithm, and elliptic curve digital signature algorithms (ECDSA). Before distribution to an end user of the computing device, a TRE manufacturer could record a set of data in nonvolatile memory for the TRE. In addition to a PP boot firmware and PP boot configuration for the PP, the data recorded in device before distribution could include a root certificate for a certificate issuer and a certificate for a timestamp authority. Other PKI keys could be recorded by a TRE manufacturer in a set of PKI keys for the primary platform as well A certificate issuer (CI) can receive a first public key and a second public key from the server and issue certificates for each of the public keys. The certificate issuer can use a first CI private key, corresponding to a CI root certificate recorded by the primary platform, to sign the server public keys. The first public key can be associated with elliptic curve key agreement and the second public key can be associated with elliptic curve digital signature algorithms (ECDSA). The certificate issuer can also (i) operate an OCSP responder to receive queries for interim certificate validity before the expiration time of the certificates and (ii) respond with a signed response and a time value, where the time value represents the end of an interim time into the future that the certificate can be considered valid and not revoked. In exemplary embodiments, the interim time could comprise weekly updates for the time value and interim verification for the validity of the certificate. The responses from the OCSP responder can use a second CI private key, where either (i) a certificate for the second CI private key is also recorded by the primary platform, or (ii) a certificate for the second CI private key is signed by the first CI private key and the certificate is sent along with the response for the interim update for certificate validity.

After boot and startup of both the device and the TRE operating the primary platform, the device can use an OFL agent as a device driver to communicate with the primary platform. The device can use the OFL agent to obtain (i) a firmware status, (ii) the primary platform identity, and (iii) a certificate for the primary platform. The firmware status can comprise a list of parameters associated with any firmware image recorded or stored by the primary platform, including a version number for either a stored firmware image or a version number for PP boot firmware. In exemplary embodiments, the set of cryptographic parameters in the certificate for the primary platform at least specifies a specific ECC curve for use with the primary platform private key. The device can establish a secure session with the server and receive a first server certificate for the server, where the certificate includes OCSP stapling of a current OCSP response from the certificate issuer for the first server certificate. The OCSP response with the first server certificate can include a first time value. The device can forward the first server certificate with the OCSP response and the first time value to the primary platform using the OFL agent.

The primary platform can receive the first server certificate with the OCSP response and first the time value. The primary platform can use a certificate for the certificate issuer to verify the first time value, where the first time value is stored for a later comparison with a received timestamp. The primary platform can derive an ephemeral PKI key pair comprising a first ephemeral private key and a first ephemeral public key, using parameters from the first server certificate. The primary platform can conduct a first key exchange in order to derive a first symmetric ciphering key and encrypt the certificate for the primary platform using the derived first symmetric ciphering key. The primary platform can send the ephemeral public key and the encrypted certificate for the primary platform to the OFL agent in the device, which forwards the data to the server through the secure connection.

The server can receive the ephemeral public key and the encrypted certificate for the primary platform and conduct a public key validation step for the ephemeral public key. The server can conduct a second key exchange using the received first ephemeral public key and a first server private key corresponding to the server public key sent in the first server certificate, in order to derive the first symmetric ciphering key. The server can decrypt the primary platform certificate using the derived first symmetric ciphering key.

The server can derive an ephemeral PKI key pair which includes a second ephemeral public key and a second ephemeral private key. The server can conduct a series of steps to encrypt the received firmware image and the signed timestamp, where the series of steps include using (i) the public key from the primary platform certificate, (ii) a second private key corresponding to a second public key in a second server certificate, and (iii) the derived second ephemeral private key. The server can send a message to the device with at least the second ephemeral public key, the encrypted image, the signed timestamp, and the second server certificate. The message with the second server certificate can also include OCSP stapling of a current OCSP response from the certificate issuer for the certificate. The OCSP response with the second certificate can include a second time value.

The device can receive the message from the server and use the OFL agent to send the second ephemeral public key, the encrypted image, the signed timestamp, and the second server certificate to the primary platform operating in the tamper resistant element. The primary platform can conduct a series of steps in a firmware load function in order to process the data received. The device can use (a) the received second ephemeral public key and a private key corresponding to the public key in the primary platform certificate to (b) derive at least a second symmetric ciphering key. The primary platform can use the derived symmetric ciphering key and a symmetric ciphering algorithm to decrypt the encrypted data forwarded from the device in the message to the TRE. The primary platform can decrypt the encrypted firmware image. The message can include an access rights pattern that is signed by the image owner, and the primary platform can verify the signature for the access rights platform using a public key for the image owner. The primary platform can use the access rights pattern to determine if loading and operating with the firmware image is authorized, as well as other constraints for the firmware image.

The primary platform can verify the signed timestamp using a recorded certificate for the timestamp authority. The primary platform can use a certificate for the certificate issuer to verify a second time value from the OCSP stapling with the second server certificate. The primary platform can compare both (i) the first time value from OCSP stapling for the first server certificate and (ii) the second time value from OCSP stapling for the second server certificate with (iii) the received, verified timestamp value. If the received, verified timestamp value is before both the first time value and the second time value (where the first time value and the second time value can represent the end time for validity of OCSP stapling values), then the primary platform can continue the firmware load function and establish a firmware session using the received, decrypted, and authenticated firmware from the message.

If the received, verified timestamp value is after either the first time value or the second time value, then the primary platform cannot trust or rely that both the first server certificate and the second server certificate remain valid and have not been revoked. If the received, verified timestamp value is after either the first time value or the second time value, then the primary platform can send an error response to the server through the device and stop the firmware load process, so that the received firmware is not loaded until certificates with time values (e.g. outside window of time validity or "expiration" of the OCSP stapling data) greater than the timestamp are received and verified by the primary platform.

BRIEF DESCRIPTION OF THE DRAWINGS

Various exemplary embodiments are described herein with reference to the following drawings, wherein like numerals denote like entities.

FIG. 1b is a graphical illustration of hardware, firmware, and software components for a device, including a tamper resistant element with a primary platform, in accordance with exemplary embodiments;

FIG. 1c is a graphical illustration of a primary platform, in accordance with exemplary embodiments;

DETAILED DESCRIPTION OF EXEMPLARY EMBODIMENTS OF THE INVENTION

FIG. 1a

Figure 1A:
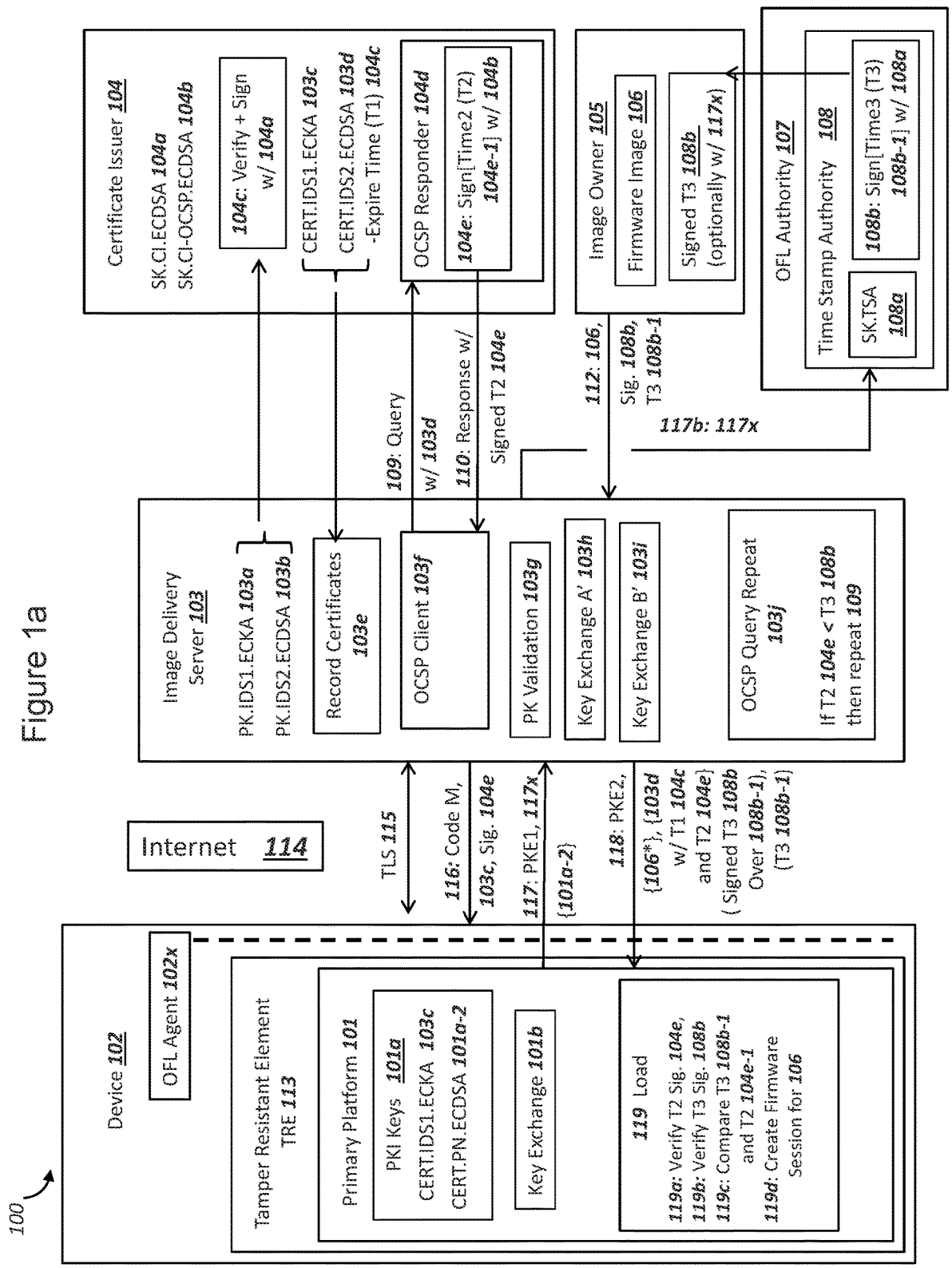
FIG. 1a is a graphical illustration of an exemplary system, where a device with a tamper resistant element and a server securely transfer encrypted firmware from the server to the tamper resistant element, in accordance with exemplary embodiments.

FIG. 1a is a graphical illustration of an exemplary system, where a device with a tamper resistant element and a server securely transfer encrypted firmware from the server to the tamper resistant element, in accordance with exemplary embodiments. The system 100 can include a device 102, a server 103, a certificate issuer 104, an image owner 105, an open firmware loader (OFL) authority 107, and a network 114. The various computing nodes depicted in FIG. 1a can establish secure sessions such as a Transport Layer Security (TLS) 115 session over an Internet Protocol (IP) network 114, including the TLS 115 session depicted between device 102 and server 103. Server 103 can comprise an image delivery server (IDS). Although a single server 103, device 102, a CI 104, etc. are depicted in FIG. 1a, a system 100 can comprise a plurality of the computing nodes. In addition, although a single server 103 is depicted in FIG. 1a, the exemplary server 103 shown for system 100 can comprise either different physical computers such as rack-mounted servers, or different logical or virtual servers or instances operating in a "cloud" configuration, including different computing processes which are geographically dispersed.

Device 102 can be a computing device for sending and receiving data, including a wireless device. Device 102 can take several different embodiments, such as a general purpose personal computer, a mobile phone based on the Android® from Google® or the IOS operating system from Apple®, a tablet, a device with a sensor or actuator for the "Internet of Things", a module for "machine to machine" communications, a device that connects to a wireless or wired Local Area Network (LAN), and other possibilities exist as well without departing from the scope of the present disclosure. Device 102 can also be a computing device according to GSMA technical document "iUICC POC Group Primary Platform requirements", Approved Release 1.0 dated May 17, 2017, which is hereby incorporated by reference in its entirety ("GSMA PP Requirements"). Device 102 can comprise a device such as that depicted in FIG. 6 on page 24 of the GSMA PP Requirements. Exemplary electrical components within a device 102 are depicted and described in FIG. 1b below. Other possibilities exist as well for the physical embodiment of device 102 without departing from the scope of the present disclosure.

Server 103 could also represent different logical "server-side" processes within a network, including different programs running on a server that listen and communicate using different IP port numbers within one physical server. In exemplary embodiments, server 103 can operate using the physical electrical components similar to those depicted and described for a device 102 in FIG. 1b below. Sever 103 can use electrical components with larger capacities and larger overall power consumption, compared to the capacity and power consumption for the equivalent electrical components in a device 102. Other possibilities exist as well for the physical embodiment of server 103 without departing from the scope of the present disclosure.

IP network 114 could be either a Local Area Network (LAN) or a Wide Area Network (WAN), or potentially a combination of both. IP network 114 could include data links supporting either IEEE 802.11 (WiFi) standards. Device 102 could also utilize a variety of WAN wireless technologies to communicate data in a secure session 115 with server 103, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, planned future 5G networks, and other examples exist as well. Server 103 can connect to the IP network 114 via a wired connection such as, but not limited to, an Ethernet, a fiber optic, or a Universal Serial Bus (USB) connection (not shown). IP network 114 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 114 could utilize globally routable IP addresses and also comprise an insecure network.

As depicted in FIG. 1a, device 102 can include an OFL agent 102x and a tamper resistant element 113. A device 102 can also include other electrical components and data as depicted and described in connection with FIG. 1b below, where the components for a device 102 are described in more detail. An OFL agent 102x can comprise a device program such as a device driver operating on a general processor outside of the tamper resistant element 113. Tamper resistant element (TRE) 113 can comprise a tamper resistant element as described in the GSMA PP Requirements document. Tamper resistant element can comprise a silicon enclave within a tamper resistant chip such as a "system on chip" as depicted and described in connection with FIG. 1b below.

TRE 113 in device 102 can include a primary platform (PP) 101, where a primary platform is also described in the GSMA PP Requirements document and the GP OFL document. TRE 113 could also comprise a "Smart Secure Platform" (SSP) as described in ETSI TC SCP Meeting #81 document "SCP(17)000188", which is hereby incorporated by reference in its entirety. Note that draft specifications for an SSP such as "103 666-1 SSP Draft Specification 0.8.0" are not publicly available and have restricted access on the ETSI web site as of Dec. 15, 2018. Primary platform 101 can comprise a secure operating environment, a secure enclave, a secure element, and include a dedicated processing core within a processor for device 102. Primary platform 101 can also operate in a Trusted Execution Environment (TEE) within a processor for device 102, or also within an ARM® "Trustzone" processing environment. Primary platform 101 can also comprise a SSP as contemplated by ETSI documents and draft specifications for 5G networks.

TRE 113 and PP 101 can support a variety of applications. TRE 113 can comprise the physical device such as that depicted in FIG. 1a and FIG. 1b below (e.g. silicon, electrical contacts, housing, etc.), and a primary platform 101 can comprise a secure processing environment operating within the TRE 113 (e.g. operating system, drivers, etc.). With appropriate firmware 106, TRE 113 and PP 101 could operate as an "integrated universal integrated circuit card" (iUICC), an "embedded universal integrated circuit card" (eUICC), a secure element for banking applications or payments from mobile phones, an radio-frequency identity (RFID) card, a secure bootstrap environment for device 102, a virtual key for cars or door locks, an secure environment for recording an identity and secret or private keys for drivers licenses, passports, online or web-site access, etc. Other applications for firmware 106 operating in TRE 113 and PP 101 are possible as well, without departing from the scope of the present disclosure. In general, cryptographic keys and cryptographic algorithms and parameters could be stored in PP 101 in order to securely support applications such as device programs operating on device 102. In this manner, an insecure device program also operating on device 102 would not feasibly be able to ready the cryptographic keys or use the cryptographic algorithms stored in PP 101.

Each of the above exemplary applications can be operated by a firmware 106 running within TRE 113 on PP 101. Although a single firmware 106 is depicted and described in connection with FIG. 1a, a TRE 113 and PP 101 can operate a plurality of different firmware 106 simultaneously (or "effectively simultaneously" such that rapid switching of a processor in TRE could make the firmware to appear to operate concurrently over a longer period such as a millisecond, even though only one firmware may operate at one time over a shorter period such as a nanosecond). A primary firmware can comprise the host environment for the primary platform and a secondary firmware can comprise a guest or virtual machine operating in the primary platform. A firmware 106 can comprise either the primary firmware or the secondary firmware as described in the previous sentence and other references herein.

Firmware 106 (as secondary firmware) can operate within a virtual machine for a processor for TRE 113 and PP 101. As one exemplary embodiment, firmware 106 can comprise a JAVA applet running on a java virtual machine in TRE 113, where the JAVA virtual machine can be recorded in secure boot firmware for TRE 113 and PP 101. Different firmware 106 operating within TRE 113 can be isolated from each other by conventional technology for processing hosts and/or virtual machines. Other possibilities exist as well for a TRE 113 and PP 101 to operate as a host for an application downloaded as firmware 106. In summary, the overall security of an application operated by TRE 113 and PP 101 can depend on securely receiving firmware 106 by TRE 113 and PP 101 from a server 103.

PP 101 can include a set of PKI keys 101a, a key exchange algorithm 101b, and a load function 119. Other data, functions, and electrical components can be included in a PP 101, such as the data, functions, and electrical components for a primary platform as described in the GSMA PP requirements document and the GP OFL document. As one example, but not depicted in FIG. 1a, a primary platform 101 can record a globally unique identity for the primary platform and/or TRE 113. A set of PKI keys 101a can record a plurality of certificates and private keys for primary platform 101, which can include a certificate for (i) the IDS server for elliptic curve cryptography key agreement (ECKA) of CERT.IDS1.ECKA 103c and (ii) the chip part number for a elliptic curve digital signature algorithm (ECDSA) of CERT.PN.ECDSA 101a-2. A set of PKI keys 101a can also include the exemplary keys depicted and described in connection with FIG. 1c below. CERT.P-N.ECDSA 101a-2 along with the corresponding private key can be recorded within PP 101 upon manufacturing of the TRE 113. CERT.IDS.ECKA 103c can be received by PP 101 after manufacturing, such as during setup of a TLS 115 session and before PP 101 conducts the steps for a key exchange algorithm A 101b.

Certificates depicted in FIG. 1a such as CERT.IDS.ECKA 101a-1 and CERT.IDS2.ECDSA 103d can specify values or settings for (i) conducting an ECDH or ECDHE key exchange, (ii) mutually deriving a symmetric ciphering key, (iii) an ECC curve which could comprise a commonly used name curve, (iv) PKI key lengths, and/or (iv) an elliptic curve digital signature algorithm (ECDSA), etc. Each of the certificates associated with PP 101, server 103, and other nodes in FIG. 1a can record at least one compatible set of cryptographic parameters within the depicted certificates. In exemplary embodiments, the certificates in FIG. 1a can specify values for algorithms supporting post-quantum cryptography, such as lattice-based algorithms, code-based algorithms, or multivariate-based algorithms, and other possibilities exist as well without departing from the scope of the present disclosure.

Cryptographic parameters within certificates can specify values for an elliptic curve cryptography (ECC) curve name, key length, key formatting (e.g. compressed or uncompressed), encoding rules, etc. As contemplated herein, the parameters and cryptographic algorithms used with certificates, ECC PKI keys and key exchanges or elliptic curve digital signature algorithms in the present disclosure can be compatible and substantially conform with ECC algorithms and keys as specified in (i) the IETF Request for Comments (RFC) 6090 titled "Fundamental Elliptic Curve Cryptography Algorithms", and (ii) IETF RFC 5915 titled "Elliptic Curve Private Key Structure", and also subsequent and related versions of these standards. In addition, parameters and algorithms for ECDSA in certificates can be compatible and support BSI Technical Guideline TR-03111: Elliptic Curve Cryptography. Version 2.0. Other possibilities exist as well for cryptographic parameters and algorithms specified in a certificate without departing from the scope of the present disclosure.

For use of ECC algorithms, parameters in a certificate can specify elliptic curve names such as, but not limited to NIST P-256, sect283k1, sect283r1, sect409k1, sect409r1, and other possibilities exist as well. Further, elliptic curves that do not depend on curves currently specified by the National Institute of Standards and Technology (NIST) could be utilized as well, such as, but not limited to, Curve22519, curve448, or FourQ. Parameters in a certificate can specify domain parameters for elements in system 100 to calculate values or numbers in a compatible manner, such as (i) a common base point G for use with ECC PKI key pairs and (ii) a defining equation for an elliptic curve.

Key exchange algorithm 101b can use CERT.IDS1.ECKA 103b and a derived ephemeral PKI key pair for PP 101 in order to derive a symmetric ciphering key M1 and message authentication code key H1. The public key for the derived ephemeral PKI key pair can comprise PKE1 depicted for message 117 in FIG. 1a. Key exchange algorithm 101b can comprise the steps for section 4.1.2.1 and 4.1.2.2 on page 35 of the GP OFL document. For embodiments that support the use of post-quantum cryptographic algorithms instead of ECC algorithms, the key exchange algorithm 101b can comprise a key exchange mechanism, where the symmetric ciphering key M1 could be encrypted using a public key and decrypted using a private key.

Load function 119 can use data received in message 118, including an ephemeral public key for the IDS server of PKE2 in order authenticate and decrypt an encrypted firmware 106*. As contemplated herein, an encrypted firmware 106 can be depicted and described herein as "firmware 106*" and a plaintext firmware 106 for a primary platform to establish a firmware session can be depicted and described as "firmware 106". A load function 119 for a primary platform is also depicted and described in connection with FIG. 1c below. Individual steps within a load function 119 in FIG. 1a are also described below with the description of message flows between the nodes in system 100 and operation of PP 101.

Firmware 106 recorded in PP 101 upon conclusion of a load function 119 can provide machine executable instructions for a processor in TRE 113 to execute or run. Firmware 106 could comprise a collection of compiled software libraries and programming code for the operation of TRE 113 and PP 101. Firmware 106 could comprise a Java-based applet or application as secondary firmware, where boot firmware of PP 101 establishes and operates a Java virtual machine such as, but not limited to JamVM or HaikuVM. Other platforms for virtualization and emulation of a computer system by PP 101 are possible as well, without departing from the scope of the present disclosure, where firmware 106 can be compiled or formatted to operate on PP 101 operating as a host for the virtualized computer system. In exemplary embodiments, firmware 106 can comprise an application where PP 101 operates as a process virtual machine or an application virtual machine. The environment in which firmware 106 operates can also be referred to as a managed runtime environment (MRE). Firmware 106 could also comprise a primary firmware for the operation of PP 101 as a host computer for the operation of secondary firmware.

Firmware 106 can comprise compiled software or machine executable instructions for either (i) a processor or (ii) a virtual machine in PP 101, and may also be referred to herein as an "image". In other words, although (A) firmware may traditionally refer to machine executable programming instructions that provides low-level or hardware control over computing hardware, such as memory and physical interfaces, as contemplated herein, (B) "firmware" can comprise higher level software written for a virtual machine. In addition, the computing environment of a primary platform can require secure functions such as writing and reading cryptographic keys for a firmware 106 specially designated protected memory, and thus firmware 106 comprising high level software may include features similar to traditional firmware. Further, firmware may be traditionally associated with machine executable instructions that are read from a read only memory, and firmware 106 comprising software that is loaded into primary platform 101 can have features after loading in PP 101 that are similar to traditional firmware, such as firmware 106 not being readily modified by an insecure processor in device 102. In any case, although "firmware 106" is described herein as firmware, "firmware 106" can comprise any collection of machine executable instructions which can be loaded and operated by primary platform 101. Similarly, the GSMA PP Requirements document and GP OFL document refer to the collection of machine executable code for a primary platform 101 as "firmware".

As depicted in FIG. 1a, an image delivery server 103 (or "server 103") can include a public key PK.IDS1.ECKA 103a, a public key PK.IDS2.ECDSA 103b, a record certificate function 103e, an OCSP client 103f, a public key validation function 103g, a key exchange A' 103h algorithm, a key exchange B' 103i algorithm, and a OCSP query repeat 103j function. Although not depicted in FIG. 1a, a server 103 could record the corresponding private keys for public keys PK.IDS1.ECKA 103a and PK.IDS2.ECDSA 103b. Server 103, PP 101, and the other nodes depicted in FIG. 1a can also commonly share cryptographic parameters and cryptographic algorithms as specified in the depicted certificates for FIG. 1a and FIG. 1c below. The record certificate function 103e for server 103 can record the certificate for both (i) PK.IDS1.ECKA 103a comprising CERT.IDS1.ECKA 103c and (ii) PK.IDS2.ECDSA 103b comprising CERT.IDS2.ECDSA 103d, where the public keys are sent to certificate issuer 104 and the certificates are received from certificate issuer 104.

OCSP client 103f can comprise a client to operating according to the online certificate status protocol (OCSP) according to IETF RFC 6960 titled "X.509 Internet Public Key Infrastructure Online Certificate Status Protocol—OCSP", which is hereby incorporated by reference in its entirety. OCSP client 103*f* could support future or related standards for periodically verifying or determining if a previously issued certificate has been revoked or is invalid. OCSP client 103*f* can submit a query 109 for a certificate such as CERT.IDS1.ECKA 103*c* or CERT.IDS2.ECDSA 103*d* to CI 104 and receive a response 110 from CI 104. An exemplary query 109 and response 110 for an OCSP client 103*f* is also depicted and described in connection with FIG. 2*a* below. Note that response 110 from OCSP responder 104*d* includes a signed time T2 104*e*, where signed time T2 104*e* can comprise both a digital signature portion and a plaintext time value for T2 104*e*-1 (in FIG. 2*a*). The value for T2 104*e*-1 can comprise a duration of validity confirmation of CERT.IDS1.ECKA 103*c* or CERT.IDS2.ECDSA 103*d* over a shorter period of time than the expiration time of the certificate, such as an exemplary several days or few weeks, instead of the certificate expiration time T1 104*c*. By receiving the value for T2 104*e* in an authenticated manner and using the subsequent steps described herein, PP 101 can reasonably be assured that a certificate associated with IDS server 103, such as CERT.IDS1.ECKA 103*c* or CERT.IDS2.ECDSA 103*d* has not been revoked.

A key exchange A' 103*h* algorithm for server 103 can use a received ephemeral ECC public key PKE1 from a message 117 and the secret or private key for PK.IDS.ECKA 103*a* in order to mutually derive a symmetric ciphering key M1 and MAC key H1 with PP 101. A key exchange A' 103*h* can include the step "KS13=DERIVE(SK.IDS1.ECKA)[PK.OFLECDHE]" in section 4.1.2.3 of the GP OFL document on page 36. Server 103 can then derive an ephemeral PKI key pair that includes an ephemeral public key of PKE2 and a corresponding ephemeral private key. Server 103 can conduct a key exchange B' 103*i* using the corresponding ephemeral private key and the public key from CERT.P-N.ECDSA 101*a*-2. A key exchange B' 103*i* can include the step "KS26=DERIVE(SK.IDS2.ECDHE)[PK.OFLECDHE]" in section 4.1.2.3 of the GP OFL document on page 36. Although not depicted in FIG. 1*a*, a server 103 can also conduct the other steps from section 4.1.2.3 of the GP OFL document on page 36 along with key exchange A' 103*h* and key exchange B' 103*i* in order to prepare and process a message 118 with an encrypted firmware 106* in a secure and authenticated manner.

A server 103 can include an OCSP query repeat function 103*j*. The OCSP query repeat function 103*j* can determine if a time value T2 104*e* from an OCSP response 110 is less than a timestamp T3 108*b*-1 from an image owner 105. If time value T2 104*e* is less than timestamp T3 108*b*-1, then server 103 can repeat the OCSP query 109. Time value T2 104*e*-1 could be less than timestamp T3 108*b*-1 for embodiments where T2 104*e*-1 and timestamp T3 108*b*-1 are close together and clocks for nodes in a system 100 are not fully synchronized, such as an exemplary minute apart in time. Additional details for the operation of an OCSP query repeat function 103*j* with associated time values will be described below in the overall sequence of message flows between the nodes.

A system 100 can also include a certificate issuer (CI) 104. CI 04 can comprise a collection of servers to issue certificates and also verify certificate status after issuance. CI 104 can include private or secret keys SK.CI.ECDSA 104*a* and SK.CI-OCSP.ECDSA 104*b*, a verify and sign function 104*c*, certificates CERT.IDS1.ECKA 103*c* and CERT.IDS2.ECDSA 103*d*, and an OCSP Responder 104*d*. Secret key SK.CI.ECDSA 104*a* can comprise a root private key for the root certificate and public key in CERT.CI.ECDSA 101*a*-3 recorded in primary platform PKI keys 101*a* as depicted in FIG. 1*c* below. Secret key SK.CI-OCSP.ECDSA 104*b* can comprise a private key corresponding to the public key in CERT.CI-OCSP.ECDSA 101*a*-4 recorded in primary platform PKI keys 101*a* as depicted in FIG. 1*c* below. The verify and sign function 104*c* can receive public keys from IDS 103 such as PK.IDS1.ECKA 103*a* and PK.IDS2.ECDSA 103*b* and use the secret key SK.CI.ECDSA 104*a* in order to generate certificates of CERT.IDS1.ECKA 103*c* and CERT.IDS2.ECDSA 103*d*, respectively. Note that CERT.IDS2.ECDSA 103*d* includes an expiration time T1 104*c*, which represents the time for end of the validity of the certificate.

CI 104 can operate an OCSP responder 104*d*. OCSP responder 103*d* can comprise a responder to operating according to the online certificate status protocol (OCSP) according to IETF RFC 6960 titled "X.509 Internet Public Key Infrastructure Online Certificate Status Protocol—OCSP", which is hereby incorporated by reference in its entirety. OCSP responder 104*d* could support future or related standards for periodically confirming or reporting if a previously issued certificate has been revoked or is invalid. OCSP responder 104*d* can receive a query 109 for a certificate such as CERT.IDS1.ECKA 103*c* or CERT.IDS2.ECDSA 103*d* from a server such as IDS server 103 and generate a response 110 for the query 109. An exemplary query 109 and response 110 for an OCSP responder 104*d* is also depicted and described in connection with FIG. 2*a* below.

In exemplary embodiments, CI 104 uses private key SK.CI-OCSP.ECDSA 104*b* for creating and generating the signed time value T2 104*e* instead of SK.CI.ECDSA 104*a*, and in this manner the SK.CI.ECDSA 104*a* can remain more secured (such as 104*a* being recorded offline on a different server). Consequently, PP 101 can use CERT.CI-OCSP.ECDSA 101*a*-4 recorded in PKI keys 101*a* (shown in FIG. 1*c*) to verify the signed time value T2 104*e*. In other exemplary embodiments, CI 104 can use the SK.CI.ECDSA 104*a* to generate a signature for signed time value T2 104*e*, and in these embodiments TRE 113 and PP 101 can use the CERT.CI.ECDSA 101*a*-3 (shown in FIG. 1*c*) to validate the signed time value T2 104*e* using steps equivalent to step 108*b* in FIG. 2*b* below.

A system 100 can also include an image owner 105. Image owner 105 can comprise a collection of servers to create or record firmware 106 images for PP 101 and also process or issue authentication tokens to enable PP 101 to load and operate firmware 106. The authentication tokens can include information for permission or rights of the TRE 113 to operate with the firmware 106. Note that a TRE manufacturer could also operate as an image owner 105, and other possibilities exist as well for the entity that performs the functionality of an image owner 105. An image owner 105 in a system 100 can be compatible with an image owner as described in the GP OFL document. Although a single firmware 106 image is depicted in FIG. 1*a*, an image owner 105 could record a plurality of firmware 106 images. Image owner 105 can receive signed timestamp T3 108*b* from an OFL authority 107. Note that a signed timestamp 108*b* can include both a plaintext time value T3 108*b*-1 and a digital signature from a timestamp authority (TSA). For some exemplary embodiments, a signed timestamp 108*b* can include both a plaintext time value T3 108*b*-1 and a transaction identity (ID) 117*x*, where (i) the transaction ID 117*x* can be generated by TRE 113. Additional details regarding using a signed timestamp T3 108*b* are provided in FIG. 2*b* below.

A system 100 can also include an OFL authority 107. OFL authority 107 can comprise an entity or collection of servers for granting the rights to an Image Owner for managing an image by using OFL. Although not depicted in FIG. 1a, an OFL authority 107 can also send an image owner 105 an authentication token with access rights. In some embodiments, such as when an OFL state becomes "locked", an image owner 105 can become the OFL Authority 107. As depicted in FIG. 1a, and OFL authority can operate with a time stamp authority (TSA) 108. TSA 108 could operate according to the American National Standards Institute standard X9.95 for creating signed timestamps, and other possibilities exist as well. Although depicted as operated by OFL authority 107, TSA 108 could operate outside of OFL authority 107 and be associated with OFL authority 107 or an IDS 103.

TSA 108 can record a secret key SK.TSA 108a corresponding to the public key in CERT.TSA 101a-5 from PP 101 PKI keys 101a in FIG. 1c. TSA 108 can operate a clock for tracking date and time that is closely synchronized with established time standards. TSA 108 can create a signed timestamp T3 108b using the SK.TSA 108a. The signed timestamp T3 108b can comprise a digital signature portion and a plaintext timestamp value of T3 108b-1. For some embodiments as depicted in FIG. 1a, TSA 108 could include a transaction ID 117x with the signed timestamp T3 108b, where (i) the TSA 108 could receive the transaction ID 117x from a message 117b from IDS 103 and (ii) the IDS 103 could receive the transaction ID 117x from TRE 113 in a message 117. As depicted in FIG. 1a, the signed timestamp T3 108b can be received by image owner 105, and image owner 105 can send server 103 a message 112 with both the encrypted firmware 106 and the signed timestamp 108b, along with other data to support an open firmware loader.

The nodes for system 100 depicted in FIG. 1a can communicate a series of messages with data in order for PP 101 to receive firmware 106 in a secure an authenticate manner. As described above, IDS server 103 can periodically conduct an OCSP query 109 with CI 104 in order to receive a response 110, where an exemplary response 110 is depicted and described in connection with FIG. 2a below. The response 110 can include a digital signature 104e for time value T2 104e-1, where the signed time value T2 104e-1 represents a time where a certificate for IDS 103 such as CERT.IDS1.ECKA 103c or CERT.IDS2.ECDSA 103d have not been revoked. In other words, the signed time value T2 104e-1 can comprise a point in time in the future through which the certificate can be considered valid and not revoked, where the point in time is shorter than the certificate expiration time T1 104c. In exemplary embodiments the signed time value T2 104e-1 could be an exemplary week into the future, while certificate expiration time T1 104c could be several years into the future.

As described above, server 103 could receive firmware 106 image and a digital signature 108b for timestamp value T3 108b-1 from image owner 105 in a message 112. The signed timestamp value T3 108b-1 could originate from a TSA 108. Note that IDS 103 could receive message 112 before or after device 102 and IDS server 103 establish a secure session such as TLS 115 (for embodiments where a transaction ID 117x is not included in digital signature 108b for at least T3 108b-1). For embodiments where a transaction ID 117x is included in digital signature 108b, then message 112 could be received by IDS 103 after (i) the receipt of a message 117 from TRE 113 and (ii) sending or transmitting a transaction ID value 117x to TSA 108 in a message 117b.

Although timestamp value T3 108b-1 (originating from a timestamp authority 108) along with signature 108b is depicted in FIG. 1a as being received by server 103 from an image owner 105, timestamp value T3 108b-1 along with signature 108b could be received from another entity for a system 100 besides image owner 105. For some embodiments, server 103 could operate as a timestamp authority and generate timestamp value T3 108b-1 along with signature 108b. Device 102 and server 103 can establish a secure session, which could comprise a TLS session 115. For system 100, server 103 and device 102 may establish a secure session 115, which could comprise establishing a secure communications link between the two servers using protocols such as TLS, IPSec, a virtual private network (VPN), a secure shell (SSH), or similar networking, transport, or application layer technologies in order to establish secure communications between server 103 and device 102.

Secure session 115 is depicted in FIG. 1a as "TLS 115" but other methods for establishing secure sessions could be used as well, including Datagram Transport Layer Security (DTLS). Secure session 115 can utilize certificates for server 103 and/or device 102 in order to provide mutual authentication and mutual key derivation for a symmetric encryption key in secure session 115. For some embodiments, the use of a certificate for device 102 in secure session 115 could be omitted, and for these embodiments only server 103 would be authenticated. Other possibilities exist as well for establishing a secure session 108 between server 103 and device 102 without departing from the scope of the present disclosure. Server 103 can begin listening for incoming messages from a device 102 using a physical network interface that provides connectivity to the IP network 114 and server 103 can use a specific port number such as TCP port 443 to listen for incoming data for secure session 115 from a device 102. Note that TLS session 115 is established between device 102 and server 103, and a TRE 113 may not establish the secure session directly, but rather send and receive data over a secure session established by device 102.

As depicted in FIG. 1a, server 103 can use an OCSP Query Repeat 103j step after the receipt or generation of a signed timestamp T3 108b-1, such as the receipt in a message 112. For embodiments where (i) a clock to generate T3 108b-1 and (ii) the validity time set by a CI 104 and specified in T2 104e-1 are close together, such as a few seconds apart, there could be instances where time for received T3 108b is after the time value T2 104e-1. Server 103 could detect that T3 108b-1 is after T2 104e-1 in an OCSP Query Repeat 103j step before sending message 118 and consequently "refresh" or repeat the query 109 with responder 101d in order to obtain a response 110 with a signed time value T2 104e-1 that is after the signed timestamp T3 108b-1.

Server 103 can then send device 102 a message 116, where message 116 can include a value for code M and the certificate for server 103 comprising CERT.IDS1.ECKA 103c. Code M can comprise a challenge or nonce from server 103 which will subsequently be signed and used by PP 101 in order to authenticate PP 101 with server 103. Note that in exemplary embodiments, CERT.IDS1.ECKA 103c in message 116 can utilize OCSP stapling, which is also known as the TLS Certificate Status Request extension. The extension is described in section 8, "Certificate Status Request" of IETF RFC 6066 titled "Transport Layer Security (TLS) Extensions: Extension Definitions". In other words, the certificate 103c in message 116 can include a response 110 from OCSP responder 104d, where a response 110 is also depicted and described in connection with FIG. 2a below.

An extension for certificate 103c verifying CERT.IDS1.ECKA 103c has not been revoked for an interim period could utilize related or future versions of the standards as well.

Note that CERT.IDS1.ECKA 103c in message 116 can include a first signed time value T2 104e-1 where the digital signature comprises 104e. A second time value T2 104e-1 for CERT.IDS2.ECDSA 103d can be included in message 118 below. In exemplary embodiments, message 116 could also include a CERT.CI-OCSP.ECDSA 101a-4 (not shown in FIG. 1a but shown in FIG. 1c), where CERT.CI-OCSP.ECDSA 101a-4 can be used to verify the first signed time value T2 104e-1 in the form of digital signature 104e. For embodiments where CERT.CI-OCSP.ECDSA 101a-4 is included in a message 116, then PP 101 can use certificate CERT.CI.ECDSA 101a-3 to validate the certificate CERT.CI-OCSP.ECDSA 101a-4.

Device 102 can receive message 116 and forward data in the message to PP 101 through OFL agent 102x. PP 101 can receive the data from message 116 and conduct steps in section 4.1.2.1 and 4.1.2.2 of the GP OFL document, including a key exchange 101b in order to encrypt CERT.P-N.ECDSA 101a-2. PP 101 can then respond to OLF agent 102x with a derived ephemeral public key PKE1 and the encrypted CERT.PN.ECDSA 101a-2. Device 102 using a TRE 113 can also generate a transaction ID 117x, where transaction ID 117x can comprise a pseudo-random number or other unique number to uniquely identify a subsequent message 117 and response 118. Device 102 can then send server 103 a message 117, where message 107 includes the derived ephemeral public key PKE1 and the encrypted CERT.PN.ECDSA 101a-2, and also the transaction ID 117x. Note that message 117 can include other data from steps in section 4.1.2.1 and 4.1.2.2 of the GP OFL document.

Server 103 can receive message 117 and conduct the series of steps to verify the received ephemeral public key PKE1 and derive a symmetric ciphering key that was used to encrypt CERT.PN.ECDSA 101a-2. Server 103 can conduct a public key validation step 103g on received ephemeral public key PKE1 in order to ensure the key is valid and on the selected curve in parameters for CERT.IDS1.ECKA 103a. Step 103g by server 103 can comprise conducting the steps for an ECC Full Public-Key Validation Routine in section 5.6.2.3.2 of FIPS publication SP 800-56A (revision 2) for the received device ephemeral public key PKE1. Alternatively, step 103g can comprise server 103 performing the steps ECC Partial Public-Key Validation Routine in section 5.6.2.3.3 of the same FIPS publication. Other example steps within a public key validation step 103g can comprise (i) verifying the public key is not at the "point of infinity", and (ii) verifying the coordinates of the point for the public key are in the range [0, p−1], where p is the prime defining the finite field. Other possibilities exist as well for evaluating and validating a received public key is cryptographically secure in a public key validation step 103g, without departing from the scope of the present disclosure.

In exemplary embodiments, a public key validation step 103g can include verifying that a point or public key received in a message such as message 117 is not reused, and in this manner a step 103g can be used to reject messages 299 that could comprise a "replay attack". Server 101 could record in a server database a list of received PP 101 ephemeral public keys PKE1 for an extended period of time, and if any key PKE1 is reused then message 117 could be rejected. The period of time could be suitable for the application used by TRE 113 and server 103, including potentially a period of years. As contemplated in the present disclosure a PP 101 and server 102 can conduct a public key validation step 103g any time a public key or a point on an elliptic curve is received.

Server 103 can conduct the key exchange A' 103h with the PKE1 and secret key for PK.IDS1.ECKA 103a in order to derive the symmetric ciphering key. Server 103 can use the symmetric ciphering key to decrypt CERT.PN.ECDSA 101a-2 and read and process data using the plaintext certificate. Note that transaction ID 117a can be included either (i) within ciphertext that includes CERT.PN.ECDSA 101a-2 or (ii) as plaintext within message 117 and external to the ciphertext. For some exemplary embodiments as depicted in FIG. 1a, server 103 can then send the Timestamp Authority (TSA) 108 the transaction ID 117a in a message 117b.

Server 103 can use the steps in section 4.1.2.3 of the GP OFL document in order to process data for a message 118 with the ciphertext firmware 106*. Server 103 can receive the data for a message 118 to send to device 102 from image owner 105 in a message 112. Message 118 can include both (i) a digital signature 108b for timestamp T3 108b-1 and (ii) the timestamp T3 108b-1. A server 103 can conduct the key exchange step B' 103i when conducting the steps for section 4.1.2.3 of the GP OFL document. Server 103 can then send device 102 a message 118, where message 118 includes an ephemeral public key PKE2, (i) the ciphertext firmware 106* (ii) an encrypted CERT.IDS2.ECDSA 103d, and (iii) a timestamp T3 108b-1 along with the digital signature 108b for the timestamp T3 108b-1. For some exemplary embodiments, both the timestamp T3 108b-1 and the digital signature 108b for the timestamp T3 108b-1 can be included within encrypted data within message 118, such as within a value M4 from the load function 119 depicted in FIG. 1c below.

Note that in exemplary embodiments, CERT.IDS2.ECDSA 103d in message 118 can utilize OCSP stapling, which is also known as the TLS Certificate Status Request extension as described above. In other words, the certificate 103d in message 118 can include a response 110 from OCSP responder 104d, where a response 110 is also depicted and described in connection with FIG. 2a below. An extension for certificate 103d verifying CERT.IDS2.ECDSA 103d has not been revoked for an interim period could utilize related or future versions of the standards as well. Note that CERT.IDS2.ECDSA 103d in message 118 can include a second time value T2 104e. A first time value T2 104e for CERT.IDS1.ECKA 103c could be included in message 116 above. The timestamp T3 108b-1 can be from TSA 108 and received by server 103 in message 112.

In exemplary embodiments, the timestamp T3 108b can be different than the "timestamp" generated by IDS1 in FIG. 4.1 of the GP OFL document. The timestamp generated by IDS1 in the GP OLF document (i) is not signed using a digital signature algorithm such as ECDSA and (ii) verified by TRE 113 using a certificate such as Cert.TSA 101a-5 (depicted in FIG. 1c below). In other words, the GP OFL document does not suggest a separate timestamp or verification means other than the generation of a timestamp and encryption with a static public key from an image delivery server. Further, there is no teaching or suggestion in the GP OFL document for using the transaction ID to generate the timestamp depicted in FIG. 4.1 of the GP OFL document.

Device 102 can receive message 118 and forward PP 101 in TRE 113 data from the message using OFL agent 102x. PP 101 can receive data in message 118. PP 101 can then conduct a load function 119, where details for a load function 119 are also depicted and described in connection with FIG. 1c below. In summary, load function 119 for PP 101 can conduct the series of steps for section 4.1.2.4 of the GP OFL document on page 37 with at least the additional steps depicted in FIG. 1a. Note that steps in section 4.1.2.4 of the GP OFL document on page 37 include the steps to derive symmetric ciphering keys and convert the encrypted data in message 118 into plaintext. As depicted in FIG. 1a, the use of brackets such as "{ }" depicts that the data in a message is encrypted with a symmetric ciphering key and a symmetric ciphering algorithm.

In a step 119a, PP 101 can verify the digital signature for both (i) the first time value T2 104e for CERT.IDS1.ECKA 103c (in OCSP stapling extensions for the certificate) and (ii) the second time value T2 104e for CERT.IDS2.ECDSA 103d (again in OCSP stapling extensions for the certificate) using CERT.CI-OCSP.ECDSA 101a-4 within PKI keys 101a as depicted in FIG. 1c. Note that the first time value T2 104e-1 can be received by PP 101 along with the digital signature 104e in a message 116 and the second time value T2 104e-1 can be received by PP 101 along with the digital signature 104e in a message 118. The exemplary logic for a step 119a is also depicted for a load function 119 in FIG. 1c below, such as the depicted step of "VERIFY(CERT 101a-4) [Signed T2 104e]". An exemplary signature verification step using a public key, a value, and a signature is also depicted and described in connection with FIG. 2b below. As described above, T2 104e can comprise two portions of a signature and the plaintext time value T2 104e-1, as depicted and described in connection with FIG. 2a below. Upon conclusion of a step 119a, PP 101 can record the first and second plaintext time values T2 104e-1 for use in a subsequent time comparison step 119c (where the first plaintext time value T2 104e-1 was with CERT.IDS1.ECKA 103c and the second plaintext time value T2 104e-1 was with the CERT.IDS2.ECDSA 103d. Note that the verification step 119a confirms the signatures 104e for the first time value T2 104e-1 and second time value T2 104e are valid, but PP 101 may need to verify and read a plaintext value for timestamp T3 108b-1 before determining if the first time value T2 104e-1 and second time value T2 104e-1 are acceptable time values (such as determining if time T3 108b-1 is in the future of a time T2 104e, which could be an error or unacceptable state since a certificate may have been revoked after time T2 104e and before time T3 108b). In other words, since PP 101 may not have the functionality to keep local or UTC date and time, additional data and steps can be required in order to determine if CERT.IDS1.ECKA 103c and CERT.IDS2.ECDSA 103d have not been revoked or remain reasonably valid using both (i) first time T2 104e and second time T2 104e, and (ii) time T3 108b.

A step 119b within load function 119 can comprise PP 101 verifying a signature 108b for timestamp T3 108b-1 using a public key from a certificate associated with TSA 108, such as CERT.TSA 101a-5 in PP 101 PKI keys 101a as depicted in FIG. 1c below. The exemplary logic for a second step 119a is also depicted for a load function 119 in FIG. 1c below, such as the depicted step of "Verify(CERT 101a-5) [Signed T3 108b]". Step 119b can also comprise PP 101 storing the timestamp T3 108b-1 for use in subsequent steps. Note that the signature 108b for timestamp T3 108b-1 can also be over the transaction ID 117x generated by TRE 113 and PP 101 in the processing of a message 117. Part of a step 119b can include verifying that digital signature for timestamp T3 108b is also over (or includes) the transaction ID 117x. In this manner, TRE 113 and PP 101 can trust that the signature 108b for timestamp T3 108b-1 is current and generated after TRE 113 creates transaction ID 117x and sends message 117. In other words, the use of transaction ID 117x helps prevent a "reply attack" by server 103 simply sending an old timestamp value.

A step 119c within load function 119 can comprise PP 101 comparing the first and second plaintext time values T2 104e-1 and timestamp T3 108b-1. Again, PP 101 may not keep date and time due to limited resources of a TRE 113, and thus can rely on time values with digital signatures that have been previously verified in steps 119a and 119b in order to determine if a certificate remains valid or reasonably determine that a certificate has not been revoked. In step 119c, PP 101 can compare timestamp T3 108b-1 with both the first time T2 104e-1 associated with CERT.IDS1.ECKA 103c (from message 116) and the second time T2 104e-1 associated with CERT.IDS2.ECDSA 103d (from message 118). The time values T2 can represent the "next update" date and time from an OCSP response 110 as depicted in FIG. 2a, for both of the certificates 103c and 103d. The status of the certificates in an OCSP response can also be "good" or the equivalent of not being revoked. Time values T2 should be in the future when representing the "Next Update" time within an OCSP response 110 as depicted in FIG. 2a (while PP 101 may not track local or global time).

PP 101 can compare the first and second time values T2 104e-1 (from message 116 and message 118) with timestamp T3 108b-1 in a step 119c. If the time values T2 104e-1 are greater than timestamp T3 108b, then T3 108b can be considered in the future and certificates CERT.IDS1.ECKA 103c and CERT.IDS2.ECDSA 103d can be accepted and PP 101 can proceed to step 119d for establishing a firmware session with plaintext firmware 106. Alternatively, PP 101 could determine that timestamp T3 108b is less than either of time values T2 104e-1 in a step 119c in order to accept the certificates 103c and 103d. Although not depicted in FIG. 1a, TRE 113 and PP 101 could also use the "timestamp" value from the GP OFL document in FIG. 4.1 ("GP timestamp") to additionally confirm proper time values. For example, the PP 101 could confirm that the GP timestamp is less than the first and second time values T2 104e for certificates 103c and 103d, respectively.

Note that PP 101 should perform the other steps for a load function 119 such as certificate verification, at least one ECDH key exchange to derive a symmetric key, and symmetric decryption of ciphertext in message 118 in order to read an authenticated the plaintext firmware 106. Exemplary additional steps are depicted and described in connection with FIG. 1c, and also the exemplary additional steps could comprise the steps within section 4.1.2.4 of the GP OFL document. Note that for some embodiments, the use of two separate time values T2 104e-1 and/or two separate certificates such as CERT.IDS1.ECKA 103c (from message 116) and CERT.IDS2.ECDSA 103d (from message 118) could be omitted, and the use of a single time value T2 104e-1 for a single certificate could be use in a step 119c.

For a first portion of step 119c, if timestamp T3 108b-1 is either in the future or greater than the first time value T2 104e-1 (e.g. from a message 116), then PP 101 cannot be reasonably assured or confirm that CERT.IDS1.ECKA 103c remains valid and the certificate could potentially be revoked. An equivalent determination in a step 119c can be if the first time value T2 104e-1 is less than or at a past time compared to timestamp T3 108b-1. For this case PP 101 can stop the firmware 106 load function 119 and conduct other steps or queries with server 103 in order to notify or attempt to rectify the error state. In other words, PP 101 may not be able to confirm CERT.IDS1.ECKA 103c remains valid at the time of timestamp T3 108b-1. Alternatively PP 101 could determine that the first time value T2 104e-1 is in the future or greater than timestamp T3 108b-1, and thus CERT.IDS1.ECKA 103c was reasonably valid and not revoked at the time timestamp T3 108b-1 was created. If the first time value T2 104e-1 is in the future or greater than timestamp T3 108b-1, then PP 101 can proceed with a second portion of step 119c before loading firmware 106 and step 119d for creating a firmware session to begin operating with the firmware 106 (after the next check of the second time value T2 104e-1 in the next paragraph).

For a second portion of step 119c, if timestamp T3 108b-1 is in the future or greater than or after a second time value T2 104e-1 associated with certificate 103d, then PP 101 cannot be reasonably assured or confirm that CERT.IDS2.ECDSA 103d has been revoked. An equivalent determination in a step 119c can be if the second time value T2 104e-1 is less than or at a past time compared to timestamp T3 108b. For this case PP 101 can stop the firmware 106 load function 119 and conduct other steps or queries with server 103 in order to notify or attempt to rectify the error state. In other words, PP 101 cannot confirm CERT.IDS2.ECDSA 103d remains valid at the time of timestamp T3 108b-1.

Alternatively, for a second portion of step 119c, PP 101 could determine that the second time value T2 104e-1 is in the future or greater or after timestamp T3 108b-1, and thus CERT.IDS2.ECDSA 103d was reasonably valid and not revoked at the time timestamp T3 108b-1 was created. If the second time value T2 104e-1 is in the future or greater than or after timestamp T3 108b-1 (and the first portion of step 119c is also successful), then PP 101 can proceed with loading firmware 106 and step 119d for creating a firmware session to begin operating with the firmware 106. The conclusion of a step 119d for PP 101 can comprise the exemplary state of loaded firmware in state 3 of loaded firmware in FIG. 2-5 of section 2.4 "Loading Procedure" of the GP OLF document. Other examples exist as well for (i) loading firmware 106 after a step 119c to compare time values and (ii) establishing a firmware session in a PP 101 without departing from the scope of the present disclosure.

FIG. 1b

FIG. 1b is a graphical illustration of hardware, firmware, and software components for a device, including a tamper resistant element with a primary platform, in accordance with exemplary embodiments. FIG. 1b is illustrated to include many components that can be common within a device 102, and device 102 may also operate in a wireless configuration in order to connect with a wireless network. In a wireless configuration, the physical interface 102a of device 102 may support radio-frequency (RF) communications with networks including a wireless network via standards such as GSM, UMTS, mobile WiMax, CDMA, LTE, LTE Advanced, 5G, and/or other mobile-network technologies. In a wireless configuration, the physical interface 102a may also provide connectivity to local networks such as 802.11 WLAN, Bluetooth, Zigbee, or an IEEE 802.15.4 network, among other possibilities. In a wireless configuration, device 102 could use a physical interface 102a connected with both a wireless WAN and wireless LAN simultaneously. In a wired configuration, the physical interface 102a can provide connectivity to a wired network such as through an Ethernet connection or USB connection.

The physical interface 102a can include associated hardware to provide connections to components such as radio-frequency (RF) chipsets, an RF amplifier, an antenna, cable connectors, RF filters, etc. Device drivers 102g can communicate with the physical interfaces 102a, providing hardware access to higher-level functions on device 102. Device drivers 102g may also be embedded into hardware or combined with the physical interfaces. Device drivers 102g can include an OFL agent 102x, which can be utilized by a device 102 and operating system 102h in order to read and write data to TRE 113, including communicating with a primary platform 101 within TRE 113. Device 102 may preferably include an operating system 102h to manage device drivers 102g and hardware resources within device 102. The operating systems described herein can also manage other resources such as memory and may support multiple software programs or software libraries operating on device 102, including applications that communicate with PP 101 through a device driver 102g.

The operating system 102h can include Internet protocol stacks such as a User Datagram Protocol (UDP) stack, Transmission Control Protocol (TCP) stack, a domain name system (DNS) stack, etc., and the operating system 102h may include timers and schedulers for managing the access of software to hardware resources, including TRE 113. The operating system shown of 102h can be appropriate for a low-power device with limited memory and CPU resources (compared to a server 103). Example operating systems 102h for a device 102 includes Linux, Android® from Google®, IoS from Apple®, Windows® Mobile, or Open AT® from Sierra Wireless®. Additional example operating systems 102h for device 102 include eCos, uC/OS, LiteOs, Contiki, OpenWRT, Raspbian, and other possibilities exist as well without departing from the scope of the present disclosure.

A device program 102i may be an application programmed in a language such as, but not limited to, C, C++, Java, and/or Python, and could provide functionality to support M2M applications such as remote monitoring of sensors and remote activation of actuators. A device program 102i could also comprise an application for a mobile phone, table, personal computer, or the like. Device program 102i could also be a software routine, subroutine, linked library, or software device, according to one preferred embodiment. As contemplated herein, a device program 102i may be an application operating within a smartphone, such as an iPhone® or Android®-based smartphone, and in this case device 102 could comprise the smartphone. The application functioning as a device program 102i could be downloaded from an "app store" associated with the smartphone. Device program 102i can include secure session library 102y, which can provide the functionality or "System on a Chip" (SOC) 109 instructions for conducting secure session 115.

SOC 109 can include a plurality of processing cores appropriate for typically low power consumption requirements for a device 102 (compared to a server 103), and may also function as a microcontroller. The processing cores can include at least one processor core for device 102 such as an ARM® based processor or an Intel® based processor such as belonging to the Atom or MIPS family of processors, and other possibilities exist as well including exemplary ARM Cortex-M processors and cores. A single or set of processor or processing cores could operate as a processor for device 102 and a second processor could operate as a TRE 113. Processing cores within SOC 109 can also comprise specialized processing cores, such as including hardware based cryptographic accelerators, field-programmable gate arrays (FPGAs), and other possibilities exist as well without departing from the scope of the present disclosure. For some embodiments, one core could be "split" or divided via time multiplexing such that during a first time period the processing core operates as a generic processor for device 102, and during a second time period the processing core operates as a primary platform 101. The embodiment from the previous sentence could comprise using an ARM "Trustzone" implementation for the TRE 113 and PP 101 for the system 100 and other systems herein.

Many of the logical steps for operation of device 102 can be performed in software and hardware by various combinations of sensor 102*f*, actuator 102*z*, physical interface 102*a*, device driver 102*g*, operating system 102*h*, device program 102*i*, and SOC 109. Note that device 102 may also optionally include user interface 102*j* which may include one or more devices for receiving inputs and/or one or more devices for conveying outputs. User interfaces are known in the art for devices 102 and could include a few LED lights or LCD display or OLED display, and thus user interfaces are not described in detail here. User interface 102*j* could comprise a touch screen if device 102 operates as a smartphone or mobile phone. As illustrated in FIG. 1*b*, device 102 can optionally omit a user interface 102*j*, since no user input may be required for many "Internet of Things" applications, although a user interface 102*j* could be included with device 102.

Device 102 may be a computing device or wireless device that includes computer components for the purposes of collecting data from a sensor 102*f* or triggering an action by an actuator 102*y*. Device 102 may include a central processing unit (CPU) within SOC 109, a random access memory (RAM) 102*e*, and a system bus 102*d* that couples various system components including the random access memory 102*e* to the processing unit 102*b*. The system bus 102*d* may be any of several types of bus structures including a memory bus or memory controller, a peripheral bus, and a local bus using any of a variety of bus architectures including a data bus.

Device 102 may include a read-only memory (ROM) 102*c* which can contain a boot loader program. Although ROM 102*c* is illustrated as "read-only memory", ROM 102*c* could comprise long-term memory storage chipsets or physical units that are designed primarily for writing once and reading many times, such as Electrically Erasable Programmable Read-Only Memory (EEPROM). As contemplated within the present disclosure, a read-only address could comprise an address within a read only memory such as a ROM 102*c* memory address or another hardware address for read-only operations accessible via bus 102*d*. Changing data recorded in a ROM 102*c* can require a technician have physical access to device 102, such as removing a cover or part of an enclosure, where the technician can subsequently connect equipment to a circuit board in device 102, including replacing ROM 102*c*. ROM 102*c* could also comprise a nonvolatile memory, such that data is stored within ROM 102*c* even if no electrical power is provided to ROM 102*c*.

Device 102 can include a SOC 109. SOC 109 can include TRE 113, and additional details for the operation of SOC 109 and TRE 113 is provided in other figures herein. Although TRE 113 is depicted in FIG. 1*b* as operating within SOC 109, TRE 113 could be operated within a removable unit such as an SD card, a SIM card, etc. Or TRE 113 could operate within a separate soldered chip connected to bus 102*d*. An exemplary removable form factor for TRE 113 could comprise a standard SD card, a mini SD card, a micro SD card, a mini UICC, a micro UICC, or a nano UICC, and other possibilities exist as well without departing from the scope of the present disclosure. SOC 109 can include electrical contacts (such as external pads 109*a* depicted in FIG. 1*c*) which provide electrical connectivity to bus 102*d*. SOC 109 can include NAND or NOR flash memory in order to record data when device 102 is not powered, and other nonvolatile memory technologies can be used in a storage unit as well without departing from the scope of the present disclosure.

The inclusion of TRE 113 and the operation of TRE 113 with PP 101 in SOC 109 can add functionality for SOC 109 that is not normally included in commercially available SOC in the market as of 2018, such as with the secure receipt of firmware 106 as described herein. TRE 113 within SOC 109 can include a processor, bus, and memory similar (but with less power and on a smaller scale) equivalent to bus 102*d*, and ROM 102*c*, NVM 102*s*. TRE 113 can perform cryptographic functions using either boot firmware or downloaded firmware 106 such as (i) internally deriving a private key with a corresponding public key such as PKE1 (in message 117 in FIG. 1*a*) in a cryptographically secure manner, (ii) recording the private key in a protected memory such that device 102 or external parties cannot feasibly or cost-effectively read the derived private key, and (ii) conducting key exchanges and encryption/decryption such as key exchange 101*b* from FIG. 1*a*.

Although the exemplary environment described herein employs ROM 102*c*, RANI 102*e*, and nonvolatile memory (NVM) 102*s*, it should be appreciated by those skilled in the art that TRE 113 could also operate within other types of computer readable media which can store data that is accessible by a device 102, such as memory cards, subscriber identity device (SIM) cards, local miniaturized hard disks, and the like, which may also be used in the exemplary operating environment without departing from the scope of the disclosure. The memory and associated hardware illustrated in FIG. 1*b* provide nonvolatile storage of computer-executable instructions, data structures, program devices, device program 102*i*, device drivers 102*g*, and other data for computer or device 102. Note the device 102 may include a physical data connection at the physical interface 102*a* such as a miniaturized universal serial bus adapter, firewire, optical, or other another port and the computer executable instructions such as device program 102*i*, operating system 102*h*, or device driver 102*g* can be initially loaded into memory such as ROM 102*c* or NVM 102*s* through the physical interface 102*a* before device 102 is given to an end user, shipped by a manufacturer to a distribution channel, or installed by a technician.

Further, device program 102*i*, operating system 102*h*, or device driver 102*g* can be separately loaded into NVM 102*s* before or after distribution of device 102. In some exemplary embodiments, applications or programs operating within device 102 can be given limited or restricted access to TRE 113 in order to support the applications or programs. For example, a mobile payment application operating a device program 102*i* could authenticate either device 102 or a user with keys recorded in TRE 113 and a firmware 106. Device program 102*i* could provide a graphical user interface (GUI) to a user through user interface 101*j*. Other possibilities exist as well for a device program 102*i* to operate in conjunction with keys and identities recorded in TRE 113 without departing from the scope of the present disclosure.

A number of program devices may be stored in RAM 102*e*, ROM 102*c*, or NVM 102*s*, including an operating system 102*h*, device driver 102*g*, an http client (not shown), a DNS client, and related software. TRE 113 can record program devices as well, where the program devices in TRE 113 may be focused on cryptographic operations and functions conducted within TRE 113 in support of the operation of device 102. A firmware 106 depicted and described in connection with FIG. 1*a* and other figures herein can comprise a program device. Program devices include routines, sub-routines, programs, objects, components, data structures, etc., which perform particular tasks or implement particular abstract data types. Aspects of the present disclosure may be implemented in the form of (i) a device program 102*i* which are executed by the device 102 working in conjunction with (ii) firmware 106 on TRE 113 and PP 101 to authenticate device 102 with a server using public key infrastructure. In exemplary embodiments, program devices for TRE 113 in SOC 109 can include cryptographic algorithms to operate with the cryptographic parameters specified by certificates recorded in the nodes of system 100, such as with PKI keys 101*a*.

A user may enter commands and information into device 102 through an optional user interface 102*j*, such as a keypad, keyboard (possibly miniaturized for a mobile phone form-factor), and a pointing device. Pointing devices may include a trackball, an electronic pen, or a touch screen. A user interface 102*j* may also include a display (not shown) such as a device screen. A display may also be connected to system bus 102*d* via an interface. The display can comprise any type of display devices such as a liquid crystal display (LCD), a plasma display, and an organic light-emitting diode (OLED) display. Device 102 may also include a camera (not shown) connected to or integrated with device 102 through a physical interface 102*a*, and the camera can comprise a video camera for the device 102 to collect sensor data that includes video or images. The camera (not shown) can be a CCD (charge-coupled device) camera, a CMOS (complementary metal-oxide-semiconductor) camera, or a similar device to collect video or camera input including QR codes. Other arrangements could be used as well, without departing from the disclosure.

The device 102, comprising a computer, may operate in a networked environment using logical connections to one or more remote computers, such as servers. Servers communicating with device 102 can also function as a general purpose server to provide files, programs, disk storage, remote memory, and other resources to device 102 usually through a networked connection. Additional remote computers with which device 102 communicates may include another device 102 or mobile device, an M2M node within a capillary network, a personal computer, other servers, a client, a router, a network PC, a peer device, a wireless network, or other common network nodes. The servers or networks communicating with device 102 or a remote computer typically includes many of the elements and electrical components described above relative to the device 102, including a CPU, memory, and physical interfaces. It will be appreciated that the network connections shown throughout the present disclosure are exemplary and other means of establishing a wireless or wired communications link may be used between mobile devices, computers, servers, corresponding nodes, and similar computers. The operation of a TRE 113 within device 102 with a firmware 106 can be utilized to authenticate a device 102 in each or any of the above described networking environments.

The device program 102*i* operating within device 102 illustrated in FIG. 1*b* and communicating with TRE 113 can provide computer executable instructions to hardware such as SOC 109 through a system bus 102*d* in order for a device 102 to (i) transmit and receive data with a service provider, (ii) monitor a sensor and/or change the state of an actuator 102*y*, (iii) send or receive packets with a server or network, and (iv) authenticate with a server, thus allowing the server to remotely monitor or control device 102 in an authenticated and secure manner. The device program 102*i* can enable the device 102 to authenticate and communicate with a server by recording data in memory such as RANI 102*e*, where the data can include sensor data, a destination IP address number, a packet or packet header value, an encryption or ciphering algorithm and key, a digital signature and public key, etc, where cryptographic operations or calculations for the device program 102*i* can be performed by TRE 113 using firmware 106. The data recorded in RANI 102*e* can be subsequently read by the operating system 102*h* or the device driver 102*g*. The operating system 102*h* or the device driver 102*g* can write the data to a physical interface 102*a* using a system bus 102*d* in order to use a physical interface 102*a* to send data such as a digital signature for authentication to a server using the Internet 114. In exemplary embodiments, the digital signature can be generated or processed in the TRE 113 using a PP 101 and firmware 106. Alternatively, the device program 102*i* can write the data directly to the physical interface 102*a* using the system bus 102*d*.

In general, digital signatures for authentication with a server can be performed in TRE 113, where the digital signature output is transferred from TRE 113 to RANI 102*e* using a device driver 102*g* before being transmitted from device 102 to a server through the IP network 114. The data recorded in RAM 102*e* such as a digital signature can be subsequently read by the operating system 102*h* or the device driver 102*g*. Note that device driver 102*g* can include OFL agent 102*x* in order to communicate with TRE 113. Thus, OFL agent 102*x* can be a device driver 102*g* specifically for TRE 113. The operating system 102*h* or the device driver 102*g* can write the data to a physical interface 102*a* using a system bus 102*d* in order to use a physical interface 102*a* to send data such as a digital signature for authentication to a server using the Internet 114. Alternatively, the device program 102*i* can write the data directly to the physical interface 102*a* using the system bus 102*d*. Other possibilities exist as well without departing from the scope of the present disclosure.

The device program 102*i* or operating system 102*h* using TRE 113 and PP 101 with firmware 106 can include steps to process the data recorded in memory such as encrypting data, selecting a destination address, or encoding sensor data acquired by (i) a sensor 102*f* or (ii) through a physical interface 102*a* such as a thermocouple, shock or vibration sensor, light sensor, or global positioning system (GPS) receiver, etc. The device 102 can use the physical interface 102*a* such as a radio to transmit or send (i) the data from a sensor or (ii) a digital signature from TRE 113 to a wireless network. For those skilled in the art, other steps are possible as well for a device program 102*i* or operating system 102*h* to collect data from either (i) a sensor 102*f* or (ii) a TRE 113 and send the data in a packet without departing from the scope of the present disclosure.

Conversely, in order for device 102 to receive a packet or response from server, which could include a challenge or nonce in order to authenticate a device 102 with the server, the physical interface 102*a* can use a radio to receive the challenge or nonce from a wireless network. The challenge or nonce received from the server through the wireless network could comprise a random number or a pseudo random string of digits, bits, and/or characters. The received data can include information from a server and may also comprise a datagram, a source IP address number, a packet or header value, an instruction for device 102, an acknowledgement to a packet that device 102 sent, a digital signature, and/or encrypted data. The operating system 102h or device driver 102g can use a system bus 102d and SOC 109 to record the received data such as a challenge or nonce from a server in memory such as RAM 102e, and the device program 102i or operating system 102h may access the memory in order to process the received data and determine the next step for the device 102 after receiving the data.

Processing the received data from a server to device 102 could include deciphering or decrypting received data by TRE 113 with a key recorded in TRE 113, sending the challenge or nonce to the TRE 113, reading an instruction from a server, or similar transformations of the received data. The steps within the paragraph above may also describe the steps a device program 102i can perform in order to receive a packet. For those skilled in the art, other steps are possible as well for a device program 102i or device 102 to receive a packet or challenge or nonce from a server without departing from the scope of the present disclosure. A server described herein without the designation of "server 103" or IDS 103 can comprise a different server than server 103 communicating with device 102 in support of an application operating as a device program 102i (e.g. a server supporting mobile payments, TRE 113 operating an embedded SIM, TRE 113 authenticating device 102 with a wireless network, etc.)

Moreover, those skilled in the art will appreciate that the present disclosure may be implemented in other computer system configurations, including hand-held devices, netbooks, portable computers, multiprocessor systems, microprocessor based or programmable consumer electronics, network personal computers, minicomputers, mainframe computers, servers, and the like. The disclosure may also be practiced in distributed computing environments, where tasks are performed by remote processing devices that are linked through a communications network. In a distributed computing environment, program devices may be located in both local and remote memory storage devices. In addition, the terms "mobile node", "mobile station", "mobile device", "M2M device", "M2M device", "networked sensor", or "industrial controller" can be used to refer to device 102 as contemplated herein.

Although not depicted in FIG. 1b, a server shown above in FIG. 1a such as IDS server 103 and other servers as well can include equivalent internal components as device 102 in order to operate. The server 103 in FIG. 1a could include a processor similar to SOC 109, with primary differences for the processor server being increased speed, increased memory cache, an increased number and size of registers, the use of a 64 bits for datapath widths, integer sizes, and memory address widths, as opposed to an exemplary 32 bits for processor cores in SOC 109 or an exemplary 32 or 16 bits for a processor in TRE 113. Other possibilities exist as well for the size of datapath widths for a TRE 113 and processing core in device 102 without departing from the scope of the present disclosure. Similarly, RAM in a server could be a RANI similar to RAM 102e in device 102, except the RANI in a server could have more memory cells such as supporting exemplary values greater than an exemplary 16 gigabytes, while RAM in device 102 could support fewer memory cells such as less than an exemplary 8 gigabytes. Non-volatile memory for storage in a server 103 in FIG. 1a could comprise disks, "solid state drives" (SSDs) or "storage area networks" (SAN) for a server. For a physical interface 102a, in exemplary embodiments, a server 103 in FIG. 1a could use a physical, wired LAN interface such as a high-speed Ethernet or fiber optic connection.

In exemplary embodiments, a device 102 can include the functional capabilities of (i) collecting sensor data, (ii) changing state of an actuator 102z, (iii) communicating the data associated with a sensor or actuator with a wireless network, and/or receiving a challenge or nonce from a server and sending a digital signature. The device driver 102g, operating system 102i, and/or device program 102i could optionally be combined into an integrated system for providing the device 102 functionality. Other possibilities exist as well for the configuration or combination of components illustrated in FIG. 1b without departing from the scope of the present disclosure.

FIG. 1c

FIG. 1c is a graphical illustration of a primary platform, in accordance with exemplary embodiments. A primary platform 101 can include a set of PKI keys 101a and a load function 119. Other data and structures can be included in a PP 101 operating within a TRE 113 without departing from the scope of the present disclosure. Note that a TRE 113 operating a PP 101, such as the TRE 113 depicted in FIG. 1a and FIG. 1b can include electrical components similar to those depicted for a device 101 in FIG. 1b, such as including memory, a processor, and an internal data bus. PP 101 can operate on the electrical components within TRE 113, and the exemplary set of PKI keys 101a can be recorded in nonvolatile memory or read only memory of TRE 113. The set of PKI keys 101a for PP 101 can include certificates of (i) CERT.IDS1.ECKA 103c, (ii) CERT.PN.ECDSA 101a-2, (iii) CERT.CI.ECDSA 101a-3, (iv) CERT.CI-OCSP.ECDSA 101a-4, (v) CERT.TSA 101a-5, (vi) CERT.OFL.ECDSA 101a-6, a secret key SK.OFL.ECDSA 101a-7 corresponding to the public key for a certificate of TRE 113 by server 103 or OFL authority 107, and a public key for a TRE manufacturer of PK.TREM.ECDSA 101a-8. Other keys and certificates can be recorded in a set of PKI keys 101a for a PP 101 without departing from the scope of the present disclosure. The set of PKI keys 101a can be use with cryptographic algorithms for both key exchange 101b and load function 119. Note that PP 101 and TRE 113 record the data for PKI keys 101a in a secure manner, such that device 102 cannot read or write data to PKI keys 101a without specific permission (such as device 102 passing TRE 113 certificate 103c from a message 116).

The certificates in a set of PKI keys 101a without leading numeral designations in FIG. 1c can also comprise the certificates for a primary platform as specified in the GP OFL document. The use of these PKI keys without leading numeral designations is also described in section 4.1.2.4 of the load function of the GP OFL document. The certificates in a set of PKI keys 101a depicted in FIG. 1c with numeral designations of "for 119" can comprise certificates used by a PP 101 that are not specified or contemplated by the GP OFL document. Some certificates in PKI keys 101a could be recorded during manufacturing of TRE 113, such as CERT.PN.ECDSA 101a-2 and CERT.CI.ECDSA 101a-3. Other keys in PP 101 could be subsequently received after distribution of device 102 with TRE 113 to end users, such as CERT.IDS1.ECKA 103c (which could be received via a message 116).

CERT.CI-OCSP.ECDSA 101a-4 in PKI keys 101a can comprise a certificate for PP 101 used to validate signed time value T2 104e in a step 119a, where an exemplary signed time value T2 104e is depicted in FIG. 2a below. CERT.CI-OCSP.ECDSA 101a-4 could be stored or recorded in PKI keys 101a after (i) PP 101 receives data from message 116 via device 102 and (ii) PP verifies CERT.CI-OCSP.ECDSA 101a-4 using CERT.CI.ECDSA 101a-3 (where CI 104 signs CERT.CI-OCSP.ECDSA 101*a*-4 using SK.CI.ECDSA 104*a*). Or, in other embodiments CERT.CI.ECDSA 101*a*-3 could be written along with CERT.CI-OCSP.ECDSA 101*a*-4 to nonvolatile memory of PP 101 during manufacturing of TRE 113.

Note that CI 104 can use the private key SK.CI-OCSP.ECDSA 104 corresponding to the public key in CERT.CI-OCSP.ECDSA 101*a*-4 in order to create signed time value T2 104*e*. In exemplary embodiments, (i) CI 104 uses a different private key than SK.CI.ECDSA 104*a* to sign time value T2 104*e* (since a server or computer with SK.CI.ECDSA 104*a* may be offline and more secured), and consequently (ii) PP 101 uses a public key different from the key in CERT.CI.ECDSA 101*a*-3 in order to verify signed time value T2 104*e* such as the signature in FIG. 2*a*, and the different public key can comprise the public key in CERT.CI-OCSP.ECDSA 101*a*-4. However, PP 101 could use CERT.CI.ECDSA 101*a*-3 to verify or validate CERT.CI-OCSP.ECDSA 101*a*-4 (if received in message 116), and thus CERT.CI.ECDSA 101*a*-3 can be used indirectly to verify signed time value T2 104*e*.

CERT.TSA 101*a*-5 in PKI keys 101*a* can comprise a certificate for PP 101 used to validate signed timestamp T3 108*b*, where the use of CERT.TSA 101*a*-5 by PP 101 is depicted and described in connection with FIG. 2*b* below. Timestamp Authority 108 can use a private key of SK.TSA 108*a*, corresponding to the public key in CERT.TSA 101*a*-5, in order to create the digital signature 108*b* for timestamp T3 108*b*-1. For some exemplary embodiments, the use of a separate certificate CERT.TSA 101*a*-5 to validate a digital signature 108*b* for timestamp T3 108*b*-1 could be omitted, and timestamp T3 108*b*-1 could be included in data which is signed by a private key corresponding to a different certificate stored by PP 101 in PKI keys 101*a*. As one example, timestamp T3 108*b*-1 could be included in data signed by server 103, and PP 101 could rely upon a public key from a verified certificate from server 103 such as a CERT.IDS2.ECDSA 103*d* in order to validate a digital signature 108*b* for timestamp T3 108*b*-1. For embodiments where PP 101 uses a CERT.IDS2.ECDSA 103*d* in order to validate a digital signature 108*b* for timestamp T3 108*b*-1, the received CERT.IDS2.ECDSA 103*d* can include a signed time value T2 104*e*-1 and PP 101 can verify the signed time value T2 104*e*-1 using CERT.CI-OCSP.ECDSA 101*a*-4 and/or CERT.CI.ECDSA 101*a*-3.

However, for other embodiments, such as those depicted for a load function 119 in FIG. 1*c*, the use of a separate certificate of CERT.TSA 101*a*-5 for verifying a digital signature 108*b* for timestamp T3 108*b*-1 can be preferred, since relying upon a different certificate (e.g. such as CERT.CI-OCSP.ECDSA 101*a*-4 and/or CERT.CI.ECDSA 101*a*-3) can mean essentially that the timestamp T3 108*b*-1 is "self signed", In other words, without (X) a separately signed timestamp T3 108*b*-1 which is verified by a separate CERT.TSA 101*a*-5, then (Y) PP 101 may not be able to securely rely upon timestamp T3 108*b*-1 in order to use signed time value T2 104*e*-1 to verify that a certificate CERT.IDS1.ECKA 103*c* or CERT.IDS2.ECDSA 103*d* has not been revoked.

For example with embodiments alternative to those depicted for a load function 119 in FIG. 1*c*, if timestamp T3 108*b* is within signed data verified by PP 101 using a certificate such as CERT.IDS2.ECDSA 103*d*, then PP 101 cannot securely or reliably use a time value T2 104*e*-1 associated with certificate CERT.IDS2.ECDSA 103*d*, because that means the signature for timestamp T3 108*b*-1 is essentially "self signed". If the certificate for CERT.IDS2.ECDSA 103*d* has been revoked and the private key associated with CERT.IDS2.ECDSA 103*d* has been compromised, then (i) the compromised private key associated with CERT.IDS2.ECDSA 103*d* could be used to sign timestamp T3 108*b*-1 with an earlier date before revocation of CERT.IDS2.ECDSA 103*d*, and (ii) an earlier signed timestamp T3 108*b*-1 from before revocation of CERT.IDS2.ECDSA 103*d* could be sent in a message 118 from FIG. 1*a*. Consequently, PP 101 could incorrectly determine that CERT.IDS2.ECDSA 103*d* is valid, when it could have been revoked. Thus, in exemplary embodiments PP 101 can use a recorded CERT.TSA 101*a*-5 from a set of PKI keys 101*a* in order to validate a signature 108*b* for timestamp T3 108*b*-1.

A primary platform 101 can include a load function 119. The load function 119 depicted in FIG. 1*c* can comprise the load function 119 from FIG. 1*a* with exemplary additional details for conducting signature or certificate verification, ECDH key exchange to derive symmetric ciphering keys, and also decryption with an integrity check. The steps in a load function 119 without leading numeral designations in FIG. 1*c* can also comprise the steps for a primary platform to perform to process a message 118 such as the steps specified in the GP OFL document. The use of these steps without leading numeral designations is also described in section 4.1.2.4 of the load function of the GP OFL document.

The steps depicted in FIG. 1*c* with numeral designations of a leading "119" can comprise steps of the present disclosure that are not specified or contemplated by the GP OLF document in order to securely load firmware 106 while also allowing a PP 101 to determine if a certificate has been revoked. Again, note that there is no description of certificate revocation or the use of the term "revocation" or "revoked" or like descriptions for invalidating a certificate in the GP OLF document. However, support for revocation of a certificate can be essential in order to maintain the security of a system 100 from FIG. 1*a*. Further, conventional technology for determining if a certificate has been revoked does not support revocation for firmware load with a primary platform, since the primary platform normally does not have the ability to independently keep date and time, especially when power is removed from PP 101. Subsequent descriptions for a load function 119 will focus on the additional steps not contemplated or described by the GP OLF document. Steps for a load function without leading numeral designations can be found within the GP OFL document.

A step 119*a* for a load function 119 in exemplary embodiments can comprise the depicted step of "VERIFY(CERT 101*a*-4) [Signed T2 104*e*]". PP 101 can use the certificate CERT.CI-OCSP.ECDSA 101*a*-4 from PP keys 101*a* in order to verify the signed time value T2 104*e*-1. The signed time value T2 104*e*-1 can comprise an interim time value before the expiration time T1 104*c* where CI 104 confirms that a certificate such as CERT.CI.ECDSA 101*a*-3 remains valid. In exemplary embodiments, the signed time value T2 104*e* can comprise a digital signature over a time value T2 104*e*-1, and the time value T2 104*e*-1 can comprise the plaintext time value for an end date/time of validity for an OSCP stapling, as depicted and described in connection with FIG. 2*a*.

The signed time value T2 104*e*-1 can be included as the end of an interim time window for certificate validity such as for the signed time value T2 104*e*-1 depicted in FIG. 2*a* below. The signed time value T2 104*e*-1 could be included in an OCSP response 110 value that is "stapled" or included with a certificate such as CERT.IDS1.ECKA 103*c* or CERT.IDS2.ECDSA 103*d* which are received by PP 101 via messages 116 and 118, respectively. Consequently, although a message 118 in FIG. 1*a* depicts a message 118 including a digital signature 104*e* for time value T2 104*e*-1, the message 118 can also include the time value T2 104*e*-1. Conducting an exemplary signature verification step is depicted in FIG. 2*b* below for a different signature using a different key, but the same logic and sequence of steps can be used in a step 119*a* for PP 101 to verify the signed time value T2 104*e*. Although not depicted in FIG. 1*c*, for an embodiment where PP 101 received CERT.CI-OCSP.ECDSA 101*a*-4 via device 102 from a message 116, PP 101 could also verify CERT.CI-OCSP.ECDSA 101*a*-4 using CERT.CI.ECDSA 101*a*-3 before using CERT.CI-OCSP.ECDSA 101*a*-4 in a step 119*a*.

As depicted in FIG. 1*c*, upon conclusion of a step 119*a*, PP 101 can securely read and store the plaintext time value T2 104*e*-1 (e.g. the time value T2 separate or without a signature). Note that although a single instance of step 119*a* is depicted for a load function 119 in FIG. 1*c*, a PP 101 could conduct a step 119*a* for each certificate received, such as, but not limited to CERT.IDS1.ECKA 103*c* and CERT.IDS2.ECDSA 103*d*. Consequently, after a step 119*c*, PP 101 can store and operate with more than one time value T2 104*e*-1, and subsequently use each of the time values T2 104*e*-1 with a subsequent step 119*c*. For the case where the signature verification fails in a step 119*a*, then PP 101 could abort the load firmware function 119 and report an error condition.

A step 119*b* for a load function 119 in exemplary embodiments can comprise the depicted step of "Verify(CERT 101*a*-5) [Signed T3 108*b*]". PP 101 can use the certificate CERT.TSA 101*a*-5 from PP keys 101*a* in order to verify the digital signature 108*b* for timestamp T3 108*b*-1. As contemplated herein, a "time value" and a timestamp can be considered equivalent. The digital signature 108*b* for a timestamp T3 108*b*-1 can comprise a timestamp of recent time from a TSA 108 associated with the time for which data in message 118 is processed by server 103. Although not depicted in FIG. 1*c* for a step 119*b*, a step 119*b* can comprise PP 101 verifying a digital signature over both the signed time value T3 108*b*-1 and the transaction ID 117*x*.

Since PP 101 or TRE 113 may not reliably internally track date and time, the digital signature 108*b* for a timestamp T3 108*b*-1 can represent the time PP 101 should use for checking the validity or interim validity of certificates and other time windows. The inclusion of transaction ID 117*x* within a digital signature 108*b* for timestamp T3 108*b*-1 can be useful for PP 101 to verify that the digital signature 108*b* over at least T3 108*b*-1 was generated after the PP 101 sends a message 117 with the transaction ID 117*x*. Upon conclusion of a step 119*b*, PP 101 can securely read and store the plaintext time value T3 108*b*-1 (e.g. the timestamp T3 separate or without a signature). As discussed above regarding the use of a CERT.TSA 101*a*-5, an independent certificate from server 103 can be used to verify the signed timestamp 108*b* for preferred embodiments. Although not depicted in FIG. 1*a*, the date/time value for the digital signature 108*b* of timestamp T3 108*b*-1 can be sent along with a message 118. For other embodiments, a different recorded certificate for PP 101 in PKI keys 101*a*, such as a PK.IMO.ECDSA (not depicted in FIG. 1*c*, but included in a primary platform in the GP OLF document) could be used to verify digital signature 108*b* for timestamp T3 108*b*-1 (assuming the secret key for PK.IMO.ECDSA was used to generate the digital signature 108*b* for timestamp T3 108*b*-1. In general, a certificate used to verify a signed timestamp 108*b* can be from a different entity than server 103, such as from an image owner 105, an OFL authority 107, or a TRE manufacturer.

A step 119*c* for a load function 119 can comprise PP 101 comparing the plaintext, verified time value T3 108*b*-1 with each of the time values T2 104*e*-1. As depicted in FIG. 1*c*, the time value T3 108*b*-1 should be less than each time value T2 104*e*-1. Although only a signed time value T2 104*e*-1 for CERT.IDS2.ECDSA is depicted in FIG. 1*c*, a PP 101 could also use the verified time value T3 108*b*-1 to verify a different, previous signed time value T2 104*e*-1 for CERT.IDS1.ECKA 103*c* from a message 116 in a load function 119. In other words, the timestamp T3 from data in message 118 and associated with received firmware 106 should be before each time value T2 104*e*-1. For a step 119*c*, if PP 101 determines that any time value T2 104*e*-1 is before timestamp T3 108*b*-1, then PP 101 cannot confirm that a certificate associated with the time value T2 104*e*-1 remains valid and has not been revoked. If PP 101 determines that any time value T2 104*e*-1 is before timestamp T3 108*b*-1, then PP 101 can abort the load 119 function and report the error condition. Or, PP 101 could respond with an error code and wait for an updated, valid certificate with an updated signed time value T2 104*e*-1 before completing the load function 119 and begin operating with the firmware 106, such as establishing a firmware session.

After step 119*c* then PP 101 can conduct a step 119*d* and proceed with loading firmware 106 and create a firmware session to begin operating with the firmware 106. The conclusion of a step 119*d* for PP 101 can comprise the exemplary state of loaded firmware in state 3 of loaded firmware in FIG. 2-5 of section 2.4 "Loading Procedure" of the GP OLF document. Other examples exist as well for (i) loading firmware 106 after a step 119*c* to compare time values and (ii) establishing a firmware session in a PP 101 using firmware 106 from a message 118 without departing from the scope of the present disclosure.

FIG. 2*a*

FIG. 2*a* is a simplified response from a certificate authority to verify certificate validity, in accordance with exemplary embodiments. Although a certificate normally has an ultimate expiration time, nodes in a system 100 can need the ability to check that a certificate has not been revoked. As mentioned above, a primary platform recording and using a plurality of different certificates may record and use certificates with long time frames such as several years into the future. For a system 100 potentially hundreds of servers 103 distributed globally and also connected to a public Internet 114, there is a reasonable chance that some certificates for some servers 103 may need to be revoked before the long expiration time of certificates recorded by a PP 101 in a TRE 113. The use of a protocol such as OCSP and an exemplary response 110 depicted in FIG. 2*a* can support a PP 101 determining if a certificate has been revoked.

As depicted and described in connection with FIG. 1*a*, a server 103 could operate a client for requesting a signed, updated status for a certificate. The client could comprise an OCSP client and server 103 could send the request 109 from FIG. 1*a* in order for CI 104 to generate the exemplary response 110 depicted in FIG. 2*a*. CI 104 could operate an OCSP responder 104*d* from FIG. 1*a* in order to process the request 109 and generate the response 110. The exemplary data depicted for a response 110 is shown using ECDSA algorithms with an SHA-256 hash algorithm, but other algorithms could be utilized as well.

A response 110 in FIG. 2*a* can include the query 109, such that an entity receiving the response 110 can determine the query 109 used to generate the response. As shown, the query could include hash values over the certificate issuer data and a serial number associated with the certificate being checked, such as a serial number for CERT.IDS1.ECKA 103c or CERT.IDS2.ECDSA 103d. The format and logic and algorithms used to create the exemplary data in query 109 within response 110 can be compatible with IETF RFC 6960 and future, related standards, although other, similar techniques could be used as well to generate an interim confirmation by a certificate issuer that a certificate has not been revoked.

The response data in a response 110 include the certificate issuer information and the certificate serial number, as well as a signed time value T2 104e, which can comprise a digital signature 104e. The plaintext time value T2 104e-1 can be read separately from response 110, although digital signature 104e can be over plaintext time value T2 104e-1. In exemplary embodiments, time value T2 104e-1 can comprise the value of "Next Update" or a time into the future (at the time of CI 104 creating signature 104e) through which a certificate can be considered valid. Further, the status of the certificate can be "good" or "OK" or the equivalent. The response 110 for a certificate such as CERT.IDS1.ECKA 103c or CERT.IDS2.ECDSA 103d can be appended to the CERT.IDS1.ECKA 103c or CERT.IDS2.ECDSA 103d for delivery by server 103 to device 102 and PP 101. In other words, (i) the message 116 with a CERT.IDS1.ECKA 103c can include a first response 110 with a first time value T2 104e-1 and first digital signature 104e and (ii) the message 118 with a CERT.IDS2.ECDSA 103d can include a second response 110 with a second time value T2 104e-1 and a second digital signature 104e. After verifying the signed time value T2 104e, as well as any intermediate certificate associated with the signed time value T2 104e, such as CERT.CI-OCSP.ECDSA 101a-4, PP 101 can use plaintext time value T2 104e-1 to compare with verified timestamp T3 108b to determine if the status in response 110 (e.g. "good") is at the time of timestamp T3 108b. In other words, PP 101 can trust or rely upon the status of a certificate if timestamp T3 108b before the time value T2 104e-1.

FIG. 2b

Figure 2B:
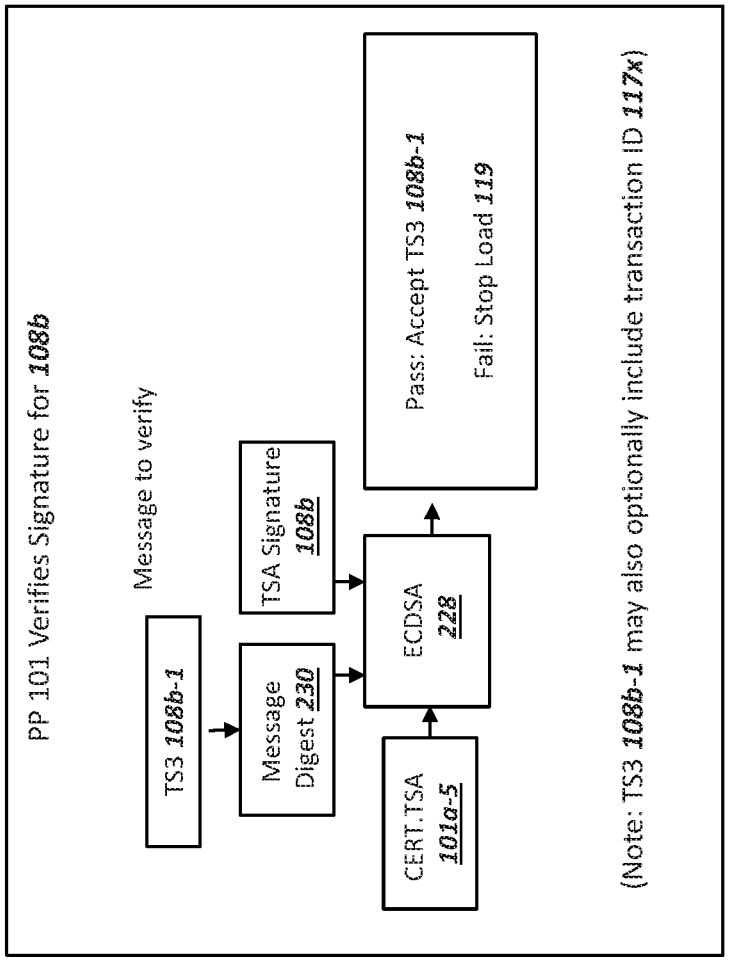
FIG. 2a is a simplified response from a certificate authority to verify certificate validity, in accordance with exemplary embodiments; and, FIG. 2b is a flow chart illustrating exemplary steps for verifying a digital signature using PKI keys, parameters, and data input, in accordance with exemplary embodiments.

FIG. 2b is a flow chart illustrating exemplary steps for verifying a digital signature using PKI keys, parameters, and data input, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present disclosure may comprise a computer program or hardware or a combination thereof which embodies the functions described herein and illustrated in the appended flow charts. However, it should be apparent that there could be many different ways of implementing the disclosure in computer programming or hardware design, and the disclosure should not be construed as limited to any one set of computer program instructions.

Further, a skilled programmer would be able to write such a computer program or identify the appropriate hardware circuits to implement the disclosed disclosure without difficulty based on the flow charts and associated description in the application text, for example. Therefore, disclosure of a particular set of program code instructions or detailed hardware devices is not considered necessary for an adequate understanding of how to make and use the disclosure. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present disclosure to function as described. However, the present disclosure is not limited to the order of the steps described if such order or sequence does not alter the functionality of the present disclosure. That is, it is recognized that some steps may be performed before, after, or in parallel other steps without departing from the scope and spirit of the present disclosure.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

A step 119a, and related steps for verifying a digital signature in the present disclosure, can use an ECC based elliptic curve digital signature algorithm (ECDSA) algorithm, and other possibilities exist as well without departing from the scope of the present disclosure. PP 101 can use a signature verification in step 119a in order to validate a signature for a received timestamp 108b. When using ECDSA algorithm in non-deterministic mode for a signature creation, a value of "k" or "r", which could comprise a random number that can be included with the digital signature 108b. When using a DSA or ECDSA in deterministic mode, such as specified in IETF RFC 6979 and titled "Deterministic Usage of the Digital Signature Algorithm (DSA) and Elliptic Curve Digital Signature Algorithm (ECDSA)", which are hereby incorporated by reference, then the requirement for a separately transmitted random number with a digital signature such as signed timestamp 108*b* (such including as value "k" or "r") can be optionally omitted, such that "r" can be deterministically calculated based on the message to sign.

In exemplary embodiments, server 103 and other servers in FIG. 1*a* can utilize deterministic ECDSA without also sending a random number along with a digital signature, although the value "r" from the deterministic mode could be sent with the digital signature such as signed timestamp 108*b*. In other words, a value can be sent with the digital signature such as signed timestamp T3 108*b* that is deterministically derived and associated with the message to sign. In other exemplary embodiments, a random number can be generated as a derived value for the random number such as "r" sent with a digital signature such as signed timestamp T3 108*b*.

For a signature verification step 119*b*, the exemplary message to verify comprises the plaintext timestamp value T3 108*b*-1, which can be decrypted by PP 101 using a load function 119. Although a load function 119 in FIG. 1*c* above depicts the timestamp value T3 108*b*-1 as decrypted from a message M4, for some embodiments the timestamp value T3 108*b*-1 could be sent as plaintext in a message 118. In other words, the timestamp value T3 108*b*-1 does not need to be encrypted using an encrypted message M4 since a digital signature 108*b* for the timestamp value T3 108*b*-1 can separately be included with a message 118 as depicted in FIG. 1*a*.

The message to verify values can be transmitted to PP 101, such as shown for timestamp T3 108*b*-1 and the digital signature 108*b* for timestamp T3. Note that in some exemplary embodiments for a step 119*b*, the message to verify can include both the timestamp T3 108*b*-1 and the transaction ID 117*x*, where PP 101 generates the transaction ID 117*x* for creation of the message 117 as depicted and described in connection with FIG. 1*a*. The message to verify values can be input into a message digest algorithm 230, which could comprise a standard algorithm such as SHA-256, SHA-3, or similar algorithms. The output of message digest algorithm 230 can be input along with parameters and a public key from a certificate such as CERT.TSA 101*a*-5 into signature verification algorithm 228. Parameters can specify encoding rules, padding, key lengths, selected algorithms, curve names, and other values or fields necessary to utilize a signature algorithm 228. Parameters can be specified in the certificate. Both a signature creation step and a signature verification step use the same or equivalent values for parameters. Private key SK.TSA 108*a* can comprise the private key used to create the digital signature 108*b* for at least the timestamp T3 108*b*-1. Although not depicted in FIG. 2*b*, a random number for values such as "k" and "r" for ECDSA and related signatures could be input as well into a signature algorithm 228.

A signature algorithm 228 for a step 119*b* can also use input of the received digital signature 108*b* for timestamp 108*b*-1, which can be received from a message 118. The calculation of a digital signature 108*b* using the public key from a certificate such as CERT.TSA 105*a*-1 can be compared with the received, digital signature 108*b*. If the two values for the calculated version of the digital signature 108*b* and the received version of the digital signature 108*b* (from message 118) match or are equal, then the received, signed timestamp T3 108*b*-1 can be considered valid and the plaintext timestamp value of T3 108*b*-1 can be used with a comparison step 119*c* and T2 104*e*-1. If the two values for the calculated version of the digital signature 108*b* and the received version of the digital signature 108*b* (from message 118) do not match or are not equal, then the received, signed timestamp T3 108*b*-1 can be considered invalid and subsequently not used. PP 101 can respond with an error code or status to request a new, different signed timestamp T3 108*b*-1 and stop the firmware load function 119.

Conclusion

Various exemplary embodiments have been described above. Those skilled in the art will understand, however, that changes and modifications may be made to those examples without departing from the scope of the claims.

The invention claimed is:

1. A method for a tamper resistant element (TRE) to securely receive firmware, the method comprising the TRE: recording a certificate issuer (CI) certificate, a TRE certificate, and a timestamp authority certificate;
receiving from an open firmware loader (OFL) agent, a first server certificate for a server, wherein the first server certificate includes a signed first time value, and wherein the TRE uses at least the CI certificate to verify the signed first time value; deriving an ephemeral PKI key pair comprising an ephemeral public key and an ephemeral private key; conducting an elliptic curve Diffie Hellman key exchange with the ephemeral private key and a server public key from the first server certificate in order to derive a symmetric ciphering key; encrypting the TRE certificate using at least the symmetric ciphering key; sending to the OFL agent the encrypted TRE certificate;
receiving from the OFL agent a message with the firmware, a signed timestamp, a certificate for an online certificate status protocol (OSCP) server, and a second server certificate for the server, wherein the second server certificate includes a signed second time value, and wherein the TRE uses at least the CI certificate to verify the signed second time value, wherein the TRE uses the certificate for the OSCP server to verify the signed second time value, and wherein the TRE uses the CI certificate to verify the certificate for the OSCP server; verifying the signed timestamp using at least the timestamp authority certificate; comparing (i) the signed first time value with the signed timestamp in order to confirm validity of the first server certificate and (ii) the signed second time value with the signed timestamp in order to confirm validity of the second server certificate; and loading the firmware for the TRE, wherein a system on a chip includes the TRE, and wherein the TRE operates a primary platform for loading the firmware.

2. The method of claim 1, wherein the first server certificate includes a first online certificate status protocol (OCSP) signature for the signed first time value, and wherein the second server certificate includes a second OCSP signature for the signed second time value.

3. The method of claim 2, wherein the signed first time value comprises a first next update value for an OCSP protocol, and wherein the signed second time value comprises a second next update value for the OCSP protocol.

4. The method of claim 1, further comprising sending to the OFL agent the encrypted TRE certificate and a transaction identity, and verifying the signed timestamp using at least the timestamp authority certificate and the transaction identity.

5. The method of claim 1, further comprising, sending, by the OFL agent, the encrypted TRE certificate to an image delivery server (IDS), and receiving, by the OFL agent, the message from the IDS.

6. The method of claim 5, further comprising, receiving, by the IDS (i) the signed timestamp from a timestamp authority, and (ii) the firmware from an image owner.

7. A method for a tamper resistant element (TRE) to securely receive firmware, the method comprising the TRE: recording a certificate issuer (CI) certificate, a TRE certificate, and a timestamp authority certificate; receiving from an open firmware loader (OFL) agent, a first server certificate for a server, wherein the first server certificate includes a first online certificate status protocol (OCSP) signature for a first time value, and wherein the TRE uses at least the CI certificate to verify the first OCSP signature; generating a transaction identity (ID); sending to the OFL agent at least the TRE certificate and the transaction ID; receiving from the OFL agent a message with the firmware, a digital signature, a certificate for an OCSP server, and a second server certificate for the server, wherein the second server certificate includes a second OCSP signature for a second time value, wherein the TRE uses the certificate for the OCSP server to verify the second OCSP signature, wherein the TRE uses the CI certificate to verify the certificate for the OCSP server, wherein the TRE uses at least the CI certificate to verify the second OCSP signature, and wherein the digital signature is generated over at least the transaction ID and a third time value; verifying the digital signature using at least the timestamp authority certificate and the transaction ID; comparing (i) the first time value with the third time value order to confirm validity of the first server certificate and (ii) the second time value with the third time value in order to confirm validity of the second server certificate; and loading the firmware for the TRE, wherein a system on a chip includes the TRE, and wherein the TRE operates a primary platform for loading the firmware.

8. The method of claim 7, further comprising receiving from the OFL agent the message with the third time value.

9. The method of claim 7, wherein the first time value comprises a first next update value for an OCSP protocol, and wherein the second time value comprises a second next update value for the OCSP protocol.

10. The method of claim 7, further comprising, sending, by the OFL agent, the TRE certificate to an image delivery server (IDS), and receiving, by the OFL agent, the message from the IDS.

11. The method of claim 10, further comprising, receiving, by the IDS (i) the digital signature from a timestamp authority, and (ii) the firmware from an image owner.

12. A method for a server to securely transmit firmware to a device, the method comprising the server:
  recording (i) a first server private key for a first server certificate and (ii) a second server certificate;
  using an online certificate status protocol (OCSP) client to receive a first signed timestamp for the first server certificate and a second signed timestamp for the second server certificate;
  sending, to the device, the first server certificate and at least the first signed timestamp;
  receiving a message from the device, wherein the message comprises an ephemeral public key and a first ciphertext with a transaction identity (ID);
  conducting a first elliptic curve Diffie Hellman key exchange with the ephemeral public key and the first server private key in order to derive a first symmetric ciphering key;
  decrypting the first ciphertext using at least the first symmetric ciphering key;
  sending the transaction ID to a timestamp authority;
  receiving, from the timestamp authority, a third signed timestamp and a first digital signature, wherein the first digital signature is over at least the transaction ID and the third signed timestamp, and wherein the third signed timestamp is less than both the first signed timestamp and the second signed timestamp;
  deriving a second server private key and a second server public key;
  conducting a second elliptic curve Diffie Hellman key exchange with the ephemeral public key and the second server private key in order to derive a second symmetric ciphering key;
  encrypting the firmware with the second symmetric ciphering key;
  generating a second digital signature for the second server public key, wherein the second digital signature is verified using the second server certificate; and
  sending, to the device, the encrypted firmware, the second server public key, the second server certificate, the second signed timestamp, the third signed timestamp, the first digital signature, and the second digital signature.

13. The method of claim 12, wherein the first signed timestamp comprises a first next update value for an OCSP protocol, and wherein the second signed timestamp comprises a second next update value for the OCSP protocol.

14. The method of claim 12, further comprising, sending, to the device, the first server certificate with a certificate for an OCSP server, wherein the certificate for the OCSP server is verified using a certificate issuer (CI) certificate.

15. The method of claim 12, wherein the first server certificate and the second server certificate are verified using a certificate issuer (CI) certificate.

16. The method of claim 12, wherein the server comprises an image delivery server (IDS), and wherein the IDS receives the firmware from an image owner.

* * * * *